(12) United States Patent
Doiron et al.

(10) Patent No.: US 12,406,019 B2
(45) Date of Patent: Sep. 2, 2025

(54) SHARING DATA VIA TRANSACTIONS OF A BLOCKCHAIN

(71) Applicant: nChain Licensing AG, Zug (CH)

(72) Inventors: Brock Doiron, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/533,081

(22) Filed: Dec. 7, 2023

(65) Prior Publication Data

US 2024/0126825 A1 Apr. 18, 2024

Related U.S. Application Data

(63) Continuation of application No. 17/642,590, filed as application No. PCT/IB2020/057799 on Aug. 19, 2020, now Pat. No. 11,893,074.

(30) Foreign Application Priority Data

Sep. 12, 2019 (GB) ...................................... 1913144

(51) Int. Cl.
  *G06F 17/00* (2019.01)
  *G06F 16/955* (2019.01)
  (Continued)

(52) U.S. Cl.
  CPC ............ G06F 16/9558 (2019.01); H04L 9/50 (2022.05); H04L 63/0428 (2013.01); H04L 63/067 (2013.01); H04L 63/18 (2013.01)

(58) Field of Classification Search
  CPC ............ G06F 16/9558; G06F 21/6218; G06F 21/6227; H04L 9/50; H04L 63/0428; H04L 63/067; H04L 63/18; H04L 9/3228; H04L 63/00; H04L 9/0863; H04L 9/3239; H04L 67/02; H04L 67/104; H04L 9/3242; H04L 9/3247; H04L 63/0838; H04L 63/10;
  (Continued)

(56) References Cited

U.S. PATENT DOCUMENTS 9,268,750 B2 2/2016 Mishra
10,505,738 B1 * 12/2019 Rule ..................... H04L 9/3215
(Continued)

FOREIGN PATENT DOCUMENTS

CN   105897426 A  *  8/2016
CN   108777698 A     11/2018
(Continued)

OTHER PUBLICATIONS

WO2018167252A1 English translation, Published Sep. 20, 2018, pp. 1-28. (Year: 2018).*
(Continued)

Primary Examiner — Laurie A Ries
(74) Attorney, Agent, or Firm — Messner Reeves LLP

(57) ABSTRACT

According to a first aspect of the disclosure, there is provided a request-response protocol for requesting access to data from a destination transaction. According to a second aspect of the disclosure, there is provided a method of accessing data from one or more destination transactions stored on a blockchain, wherein the method comprises selecting one or more hyperlinks linking to the destination transaction(s).

18 Claims, 10 Drawing Sheets

(51) Int. Cl.
*H04L 9/00* (2022.01)
*H04L 9/40* (2022.01)

(58) Field of Classification Search
CPC ............... H04L 63/123; H04L 67/1095; H04L 2209/56; G06Q 40/04
See application file for complete search history.

(56) References Cited

U.S. PATENT DOCUMENTS

| | | | |
|---|---|---|---|
| 10,721,058 B2* | 7/2020 | Housholder | G06F 21/64 |
| 10,785,035 B1* | 9/2020 | Lv | G06F 16/2379 |
| 10,841,082 B2 | 11/2020 | Ben-Ari | |
| 11,088,828 B2* | 8/2021 | Zou | H04L 9/0643 |
| 11,170,366 B2* | 11/2021 | Snow | H04L 9/3239 |
| 11,212,347 B2* | 12/2021 | Zakrzewski | H04L 63/101 |
| 11,283,595 B1* | 3/2022 | Liao | G06F 16/172 |
| 11,416,921 B2 | 8/2022 | Verma et al. | |
| 11,683,685 B2 | 6/2023 | Smith et al. | |
| 12,118,541 B2* | 10/2024 | Snow | G06F 21/64 |
| 2014/0229737 A1* | 8/2014 | Roth | H04L 9/0618 713/176 |
| 2018/0137196 A1 | 5/2018 | Han et al. | |
| 2018/0302417 A1 | 10/2018 | Wilson | |
| 2019/0026485 A1 | 1/2019 | Ansari et al. | |
| 2019/0028278 A1 | 1/2019 | Gilson | |
| 2019/0065764 A1* | 2/2019 | Wood | G06F 21/6209 |
| 2019/0132295 A1 | 5/2019 | Lenz et al. | |
| 2019/0318066 A1 | 10/2019 | Davis et al. | |
| 2019/0372756 A1* | 12/2019 | Kim | H04L 9/0863 |
| 2020/0159696 A1 | 5/2020 | Adluri et al. | |
| 2020/0372014 A1 | 11/2020 | Boshmaf et al. | |
| 2021/0133270 A1 | 5/2021 | Moyal et al. | |
| 2021/0357461 A1 | 11/2021 | Xiao | |
| 2021/0365584 A1* | 11/2021 | Harris | G06F 21/6245 |
| 2021/0383024 A1* | 12/2021 | Yang | H04L 9/50 |
| 2024/0406156 A1* | 12/2024 | Gadnis | H04L 63/08 |

FOREIGN PATENT DOCUMENTS

| | | | | |
|---|---|---|---|---|
| CN | 109033403 A | | 12/2018 | |
| CN | 109145188 A | | 1/2019 | |
| WO | WO-2013028353 A1 * | | 2/2013 | ........... G06F 21/575 |
| WO | 2017145016 A1 | | 8/2017 | |
| WO | 2018116106 A1 | | 6/2018 | |
| WO | WO-2018167252 A1 * | | 9/2018 | ........... G06F 21/645 |
| WO | 2018234922 A1 | | 12/2018 | |
| WO | WO-2019114097 A1 * | | 6/2019 | ........... G06F 16/182 |
| WO | WO-2019205860 A1 * | | 10/2019 | ......... G06F 16/2264 |
| WO | WO-2019231578 A1 * | | 12/2019 | ......... G06F 16/1805 |
| WO | 2020024895 A1 | | 2/2020 | |
| WO | 2020024903 A1 | | 2/2020 | |
| WO | 2020109907 A1 | | 6/2020 | |
| WO | 2020109908 A1 | | 6/2020 | |
| WO | 2020109909 A1 | | 6/2020 | |
| WO | 2020109910 A1 | | 6/2020 | |
| WO | 2020109911 A1 | | 6/2020 | |
| WO | 2020109912 A1 | | 6/2020 | |
| WO | 2020109913 A1 | | 6/2020 | |
| WO | 2020212796 A1 | | 10/2020 | |
| WO | WO-2024220450 A1 * | | 10/2024 | ............. G06F 3/012 |

OTHER PUBLICATIONS

Combined Search and Examination Report for Application No. GB1913142.4, Feb. 24, 2020, 6 pages.

Fielding R. T., et al., "Hypertext Transfer Protocol—HTTP/1.1," Standards Track, The Internet Society, Jun. 1999, pp. 1-114.

Hellani H., et al., "On Block Chain Technology: Overview of Bitcoin and Future Insights," 2018 IEEE International Multidisciplinary Conference on Engineering Technology (IMCET), Nov. 1, 2018, 8 pages.

International Search Report and Written Opinion issued in International Application No. PCT/IB2020/057799, mailed on Dec. 14, 2020, 19 pages.

Massimo B., et al., "An Analysis of Bitcoin OP_RETURN Metadata," Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine Learning, Nov. 19, 2017, 18 pages.

"Random Access Memory for Bitcoin," bitdb, 2019, 2 pages, https://bitdb.network/.

Solomon D., "Data Compression: The Complete Reference," Springer-Verlag, London, 2006, 4th Edition, 1112 pages.

"Store and Reference Data on the Bitcoin SV Blockchain," Github, 2019, 4 pages, Retrieved from Internet: URL: https://github.com/unwriter/B.

Wikipedia Contributors, "HMAC," Wikipedia, The Free Encyclopedia, 6 pages, Retrieved from Internet: URL: https://en.wikipedia.org/wiki/HMAC.

* cited by examiner

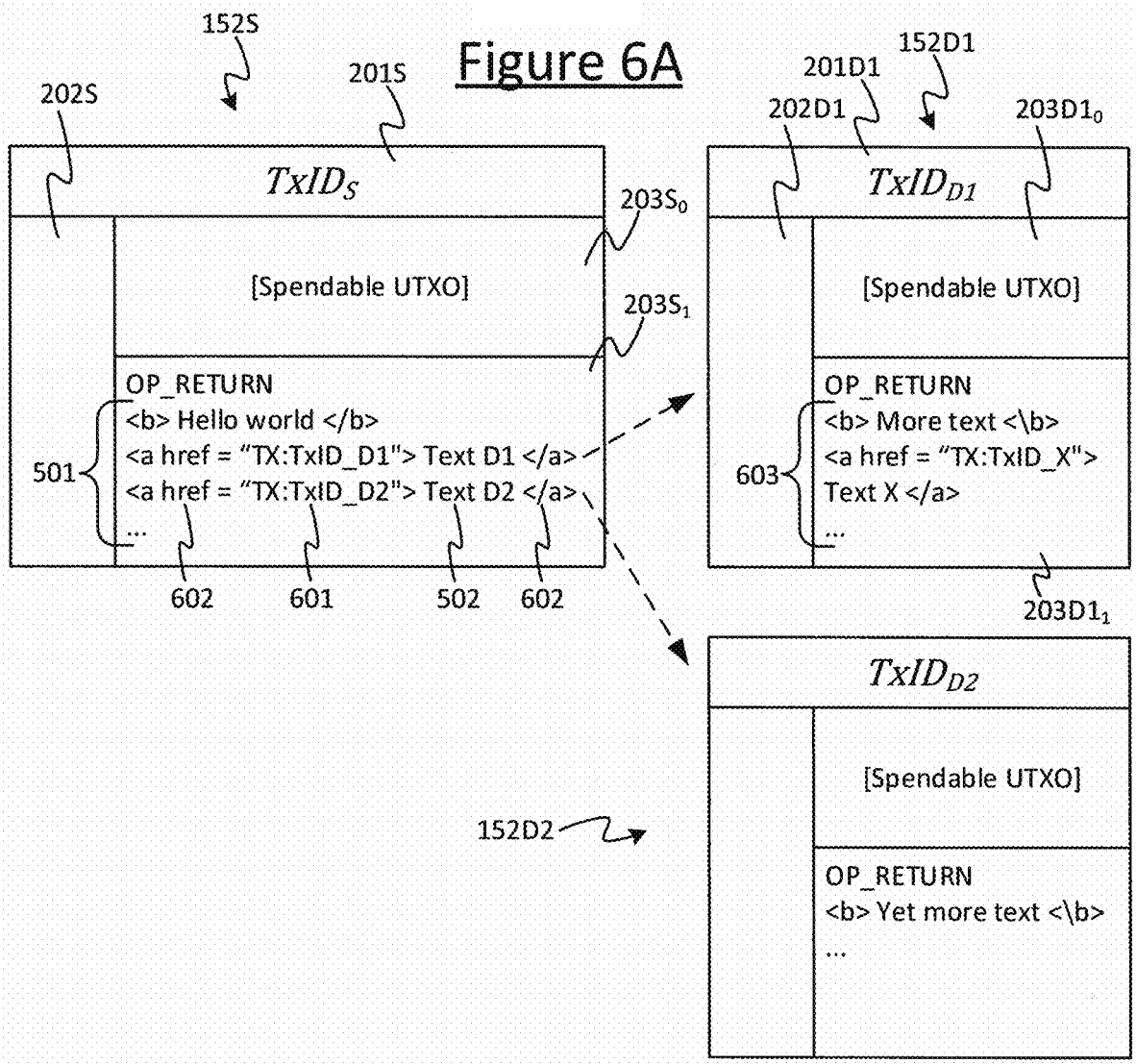
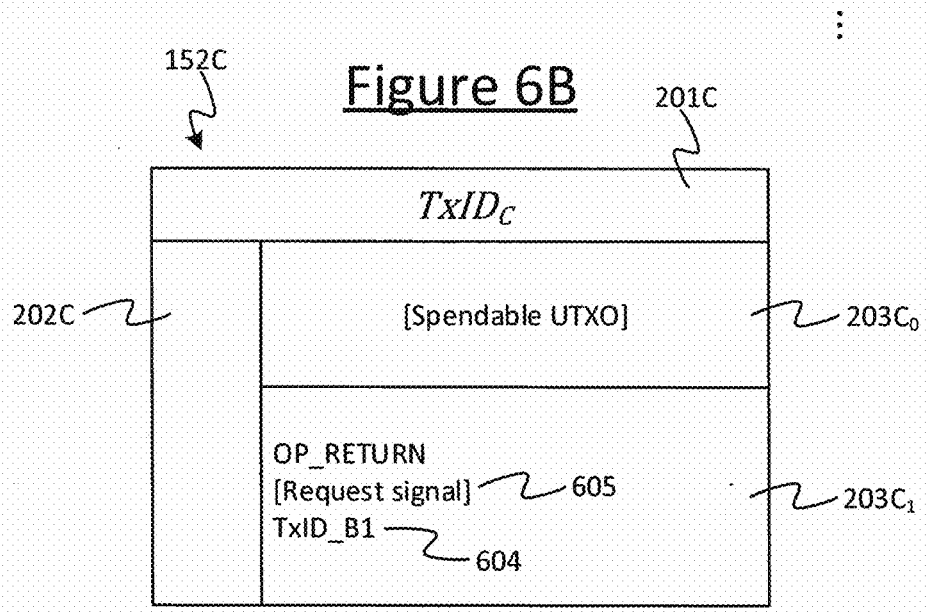

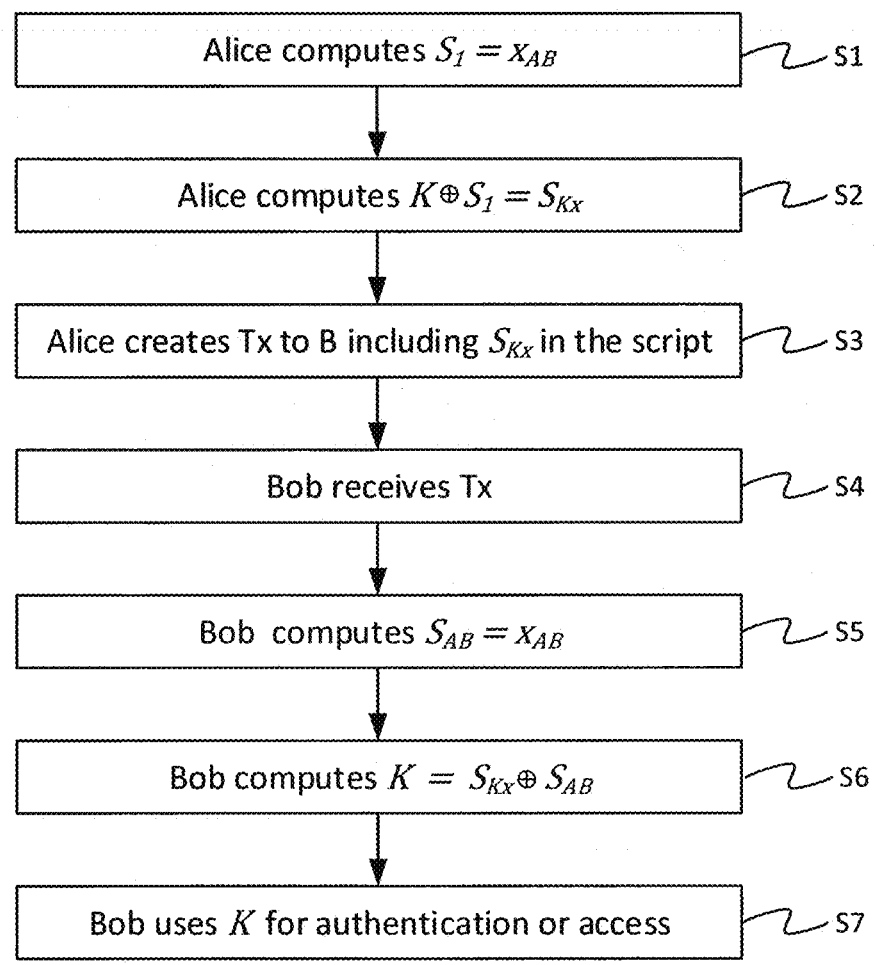

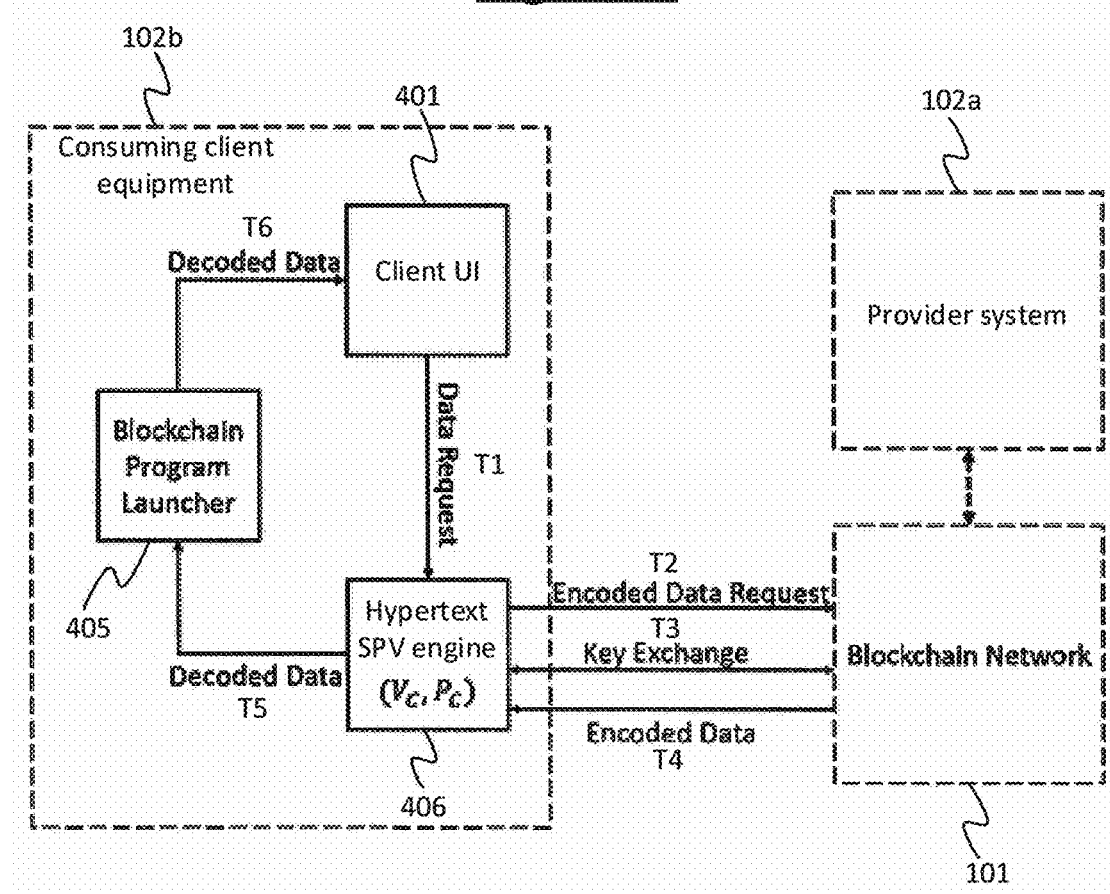

Figure 9

Bob's Request

```
{"txid": [Hash of transaction],
...
"vin": [{
"txid": [TXID of Bob's previous Transaction],
... }],
"vout": [{
"value": 0.00000000,
"n": 0,
"scriptPubKey": OP_RETURN [DESIGNATED PREFIX]
                          [TXID REQUEST]},
{"value": [TX VALUE],
"n": 1,
"scriptPubKey": {
"asm": "OP_DUP OP_HASH160 [Bob's Public Key]
        OP_EQUALVERIFY OP_CHECKSIG",
...
"addresses": ["bsv: [ BOB'S ADDRESS]"] } ] }
```

Alice's Response

```
{"txid": [Hash of transaction],
...
"vin": [{
"txid": [TXID of Alice's previous Transaction],
... }],
"vout": [{
"value": 0.00000000,
"n": 0,
"scriptPubKey": OP_RETURN [DESIGNATED PREFIX]
                          [ALICE'S ADDRESS]},
{"value": [TX VALUE],
"n": 1,
"scriptPubKey": {
"asm": "OP_DUP OP_HASH160 [Alice's Public Key]
        OP_EQUALVERIFY OP_CHECKSIG",
...
"addresses": ["bsv: [ALICE'S ADDRESS]"] } ] }
```

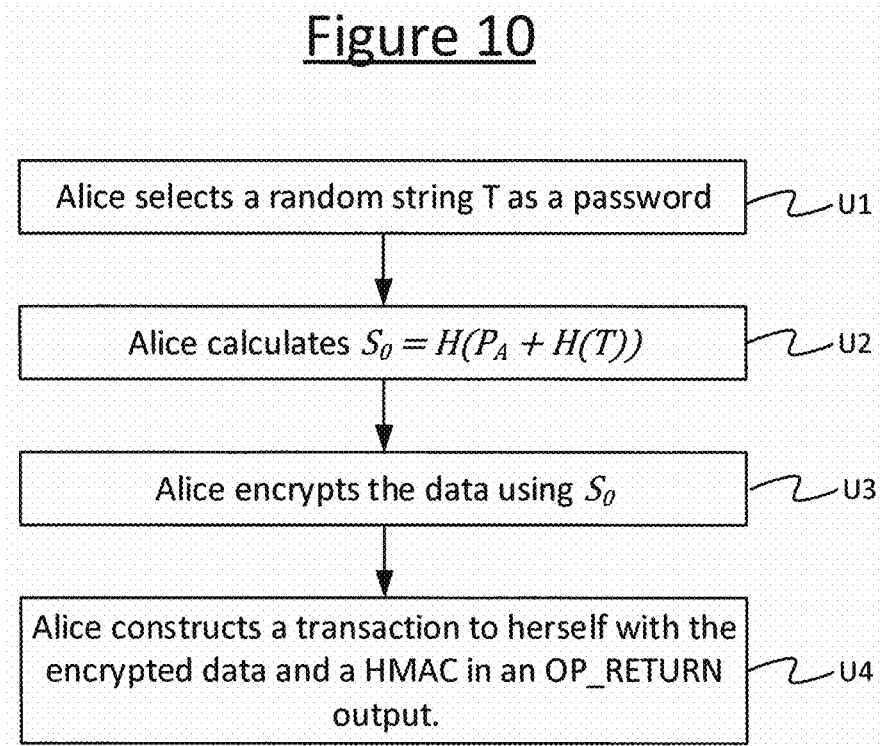

SHARING DATA VIA TRANSACTIONS OF A BLOCKCHAIN

CROSS-REFERENCE TO RELATED APPLICATIONS

The present application is a continuation of U.S. patent application Ser. No. 17/642,590 filed Mar. 11, 2022, which is the U.S. National Stage of International Application No. PCT/IB2020/057799 filed on Aug. 19, 2020, which claims the benefit of United Kingdom Patent Application No. 1913144.0, filed on Sep. 12, 2019, the contents of which are incorporated herein by reference in their entireties.

TECHNICAL FIELD

The present disclosure relates to a request-response protocol for requesting access to data from a destination transaction.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

SUMMARY

It would be desirable to provide a mechanism that integrates payment with data transfer in a manner that ensures the providing party receives payment and the consuming party receives the data.

Hence according to a first aspect of the present disclosure, there is provided a method of a consuming party accessing data from a providing party wherein the data is stored in a first transaction on a blockchain in encrypted form requiring an access key to decrypt. The method comprises, by computer equipment of the consuming party: i) communicating to the providing party a second transaction for recordal on the blockchain, the second transaction specifying a payment for the data and further including an identifier of the first transaction and a signal indicating a request for the data therefrom, wherein in response the second party broadcasts a third transaction including an encrypted password to be recorded on the blockchain; ii) inspecting the blockchain to read the encrypted password from the third transaction, wherein the password is encrypted based on a shared secret between the consuming party and the providing party, and the access key is a first predetermined function of the password; and iii) decrypting the received password based on the shared secret, determining the access key by applying the predetermined function to the decrypted password, and decrypting the data based on the determined access key. The data is included in the first transaction along with a message authentication code being a second predetermined function of the password, the second predetermined function also being a function of the data. The method further comprises: iv) computing the message authentication code based on the decrypted data and the determined password, and comparing the computed message authentication code with the message authentication code as included in the first transaction in order to authenticate the data.

According to as second aspect of the disclosure, there is provided a method of accessing data from one or more destination transactions stored on a blockchain, wherein the method comprises selecting one or more hyperlinks linking to the destination transaction(s). The first aspect could be used together with the second aspect or separately.

As the popularity of a given blockchain grows and with more-and-more resources being stored on-chain, then the blockchain may even become a rival to the World Wide Web as a framework for storing, publishing, and securely communicating resources such as text, images and audio. For instance, the so-called Metanet is one such framework implemented via a blockchain.

However, as a blockchain grows and is increasingly used as a means for storing and conveying content, it also becomes more-and-more difficult to find the desired resources on the chain. This has the potential to hinder the utility of blockchain-based systems as a medium for communicating content.

To address this, according to the second aspect disclosed herein, there is provided a method comprising, by computer equipment of a consuming party: a) accessing at least a first document comprising one or more hyperlinks, each hyperlink comprising a respective piece of anchor content and a respective identifier of a respective destination associated with the respective anchor content; b) rendering content of at least part of the first document through a user output device of the computer equipment of the consuming party, including rendering the respective anchor content of one or more of the hyperlinks; c) through a user input device of the computer equipment of the consuming party, receiving a user input selecting one of the hyperlinks by selecting the respective anchor content from among the rendered content; and d) in response to said user input, automatically accessing data from the associated destination based on the respective identifier included in the first document; wherein the respective destination of at least the selected hyperlink comprises a destination transaction of a blockchain maintained across at least some nodes of a blockchain network, and the accessing of the data comprises inspecting the destination transaction in the blockchain via the blockchain network.

For instance, the first document may comprise a list of hyperlinks each to a different destination transaction. The first document may be a hypertext document, e.g. written in a mark-up language such as HTML, but augmented with an additional type of tag for linking to transactions. The items of data in one or more of the destination transactions may themselves comprise one or more further documents such as one or more further hypertext documents, which could comprise one or more further onward hyperlinks.

The first document itself could also be stored in another, source transaction on the blockchain. Alternatively the first document could be a webpage; or a document such as a word processing document, email, spreadsheet, slideshow, etc., stored locally on the consuming party's computer equipment or on a third party server.

In an output-based model, the document(s) or other such data content may be stored in an unspendable output of their respective documents, e.g. the output being made unspendable by means of an OP_RETURN.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 7 is a flow chart of a method of providing a session key in accordance with embodiments disclosed herein, FIG. 8 is schematic block diagram illustrating a hypertext transfer procedure in accordance with embodiments disclosed herein, FIG. 9 shows the structure of an example pair of request and response transactions in accordance with embodiments disclosed herein, FIG. 10 is a flow chart illustrating a method of storing encrypted data on a blockchain in accordance with embodiments disclosed herein.

DETAILED DESCRIPTION OF EMBODIMENTS

Blockchains provide a decentralised and tamper-resistant alternative to conventional database servers. However, as block capacity increases to accommodate more data storage, a data retrieval system would be desirable in order to efficiently access information stored on the blockchain. Previously, the only way to access information used in the blockchain is to have the specific transaction reference or to search the entire blockchain (currently 168 GB in one popular blockchain, and expected to grow rapidly as block sizes increase). More recently a method of organising data on the blockchain has been proposed as a part of the Meta net. There have also been other solutions proposed to be able to query the data stored in the blockchain including bitDB and B:// bitcoin data protocol. Nonetheless, it would be desirable to provide more tools for assisting in finding relevant data on the chain.

Currently, through successive links between documents (web pages), the World Wide Web (WWW) makes it possible to navigate the internet and efficiently retrieve information. The standard protocol for linking such information, Hypertext Transfer Protocol (HTTP), uses hyperlinks (references to data) to establish connections between pages in a database or server. Users make requests to the servers by clicking a hyperlink, and the service providers return the requested information, which is displayed to the user as hypertext (text with hyperlinks).

Embodiments below provide a protocol to retrieve and display encrypted data from organised, linked data stored on the blockchain. Many files can be linked in a series of domain-redirects and stored in OP_RETURN data (which can be pruned by miners if desired). A smart wallet can decrypt and decompress data to present to a user. For instance embodiments may exploit the speed and efficiency of XOR encryption schemes for the encryption and decryption. In embodiments the Lempel-Ziv Markov chain (LZM) compression algorithm, or its derivatives or other compression techniques, may also be integrated in order to accommodate different compression speed requirements. In embodiments the XZ algorithm may be used for streamed data that can be linked and seeded from a LZM link. These can also set the peer seed data for a P2P file share for large files (such as multimedia files), streams, or messages.

Example System Overview

Figure 1:
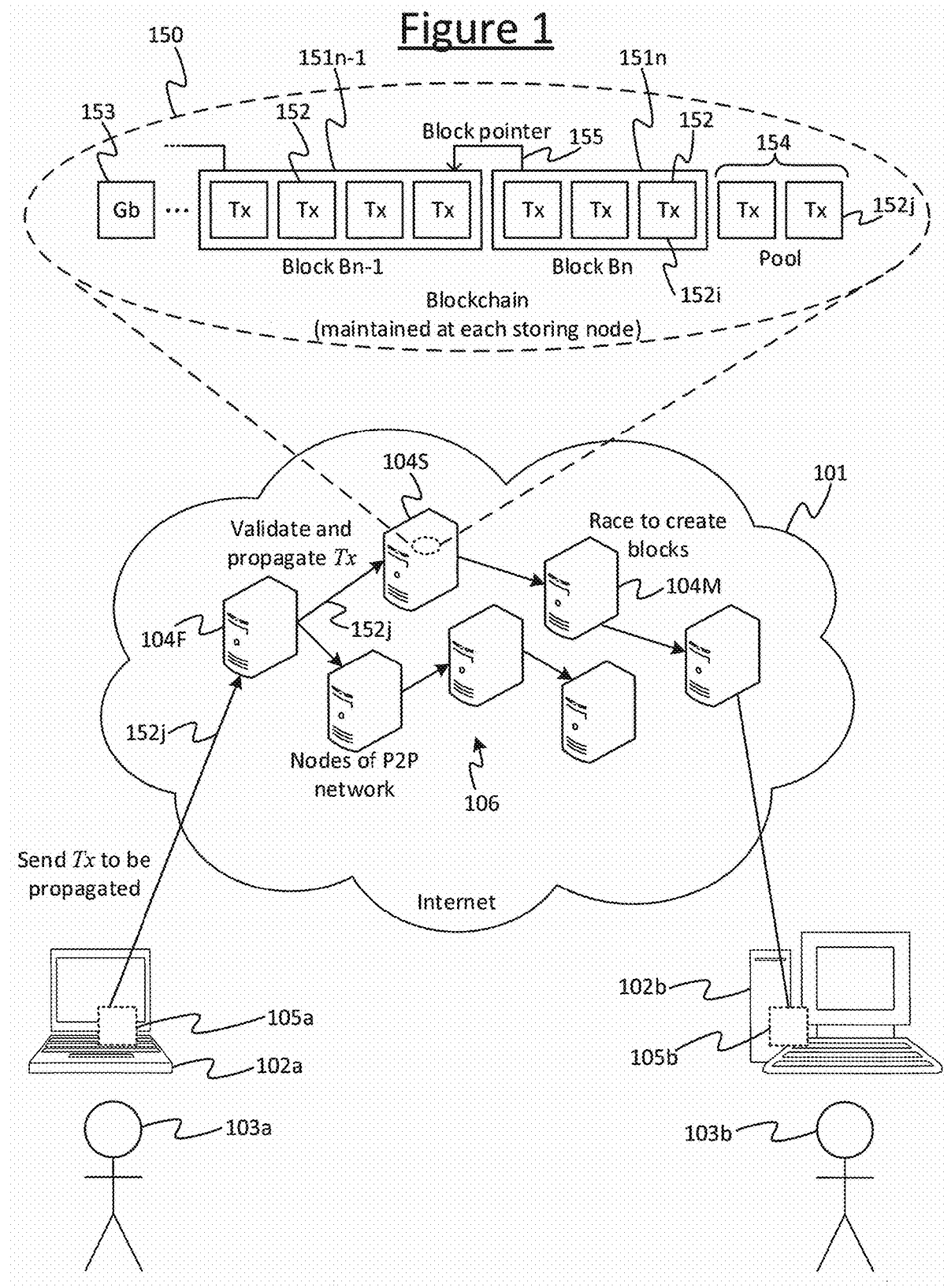
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152j according to the node protocol. Another condition for a transaction to be valid is that the output of the preceding transaction 152i which it attempts to spend or redeem has not already been spent/redeemed by another valid transaction. Again if not valid, the transaction 152j will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. The node software may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

UTXO-Based Model

Figure 2:
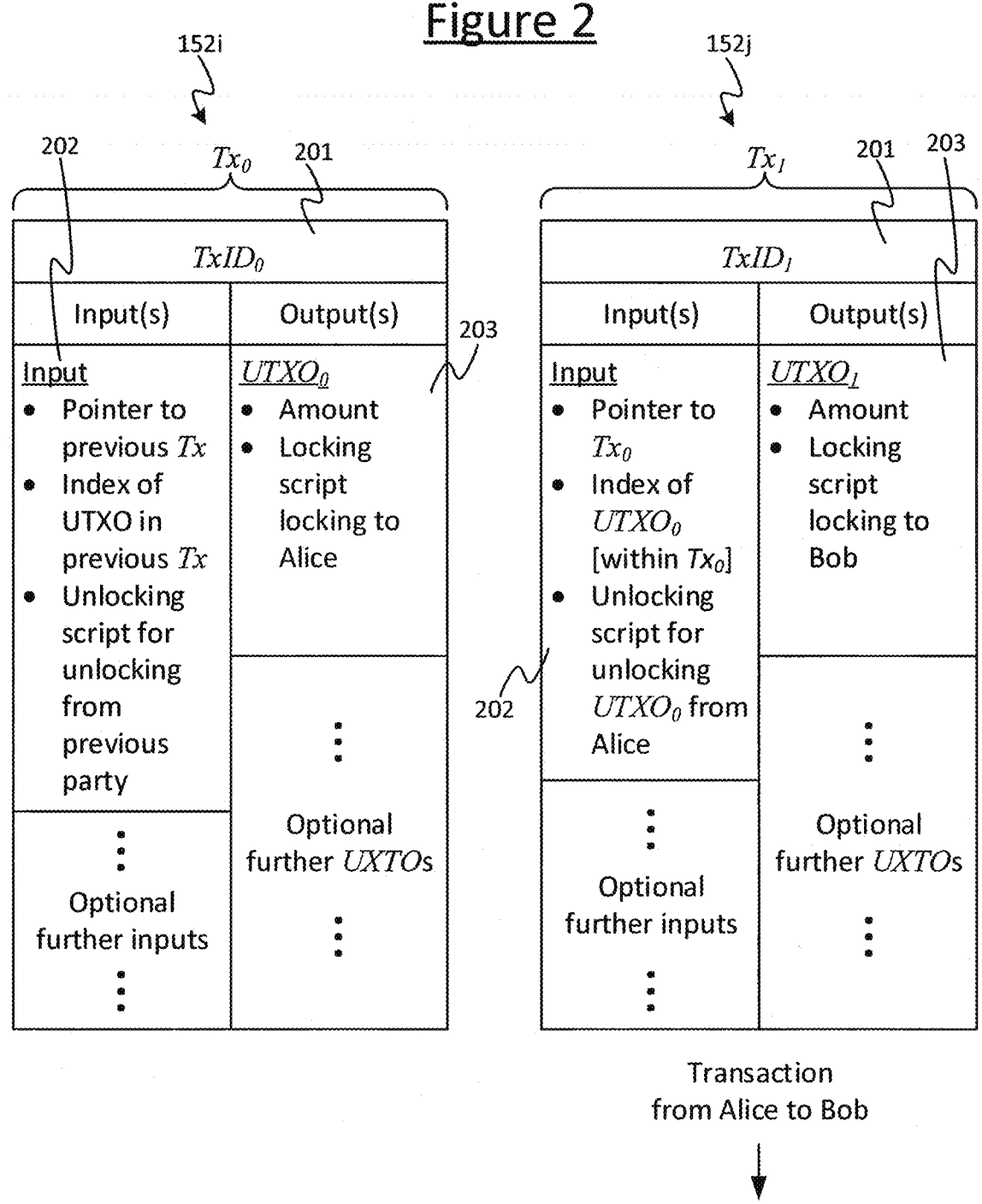
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed).

The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H($P_A$)>OP_EQUALVERIFY OP_CHECKSIG. "OP_. . ." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
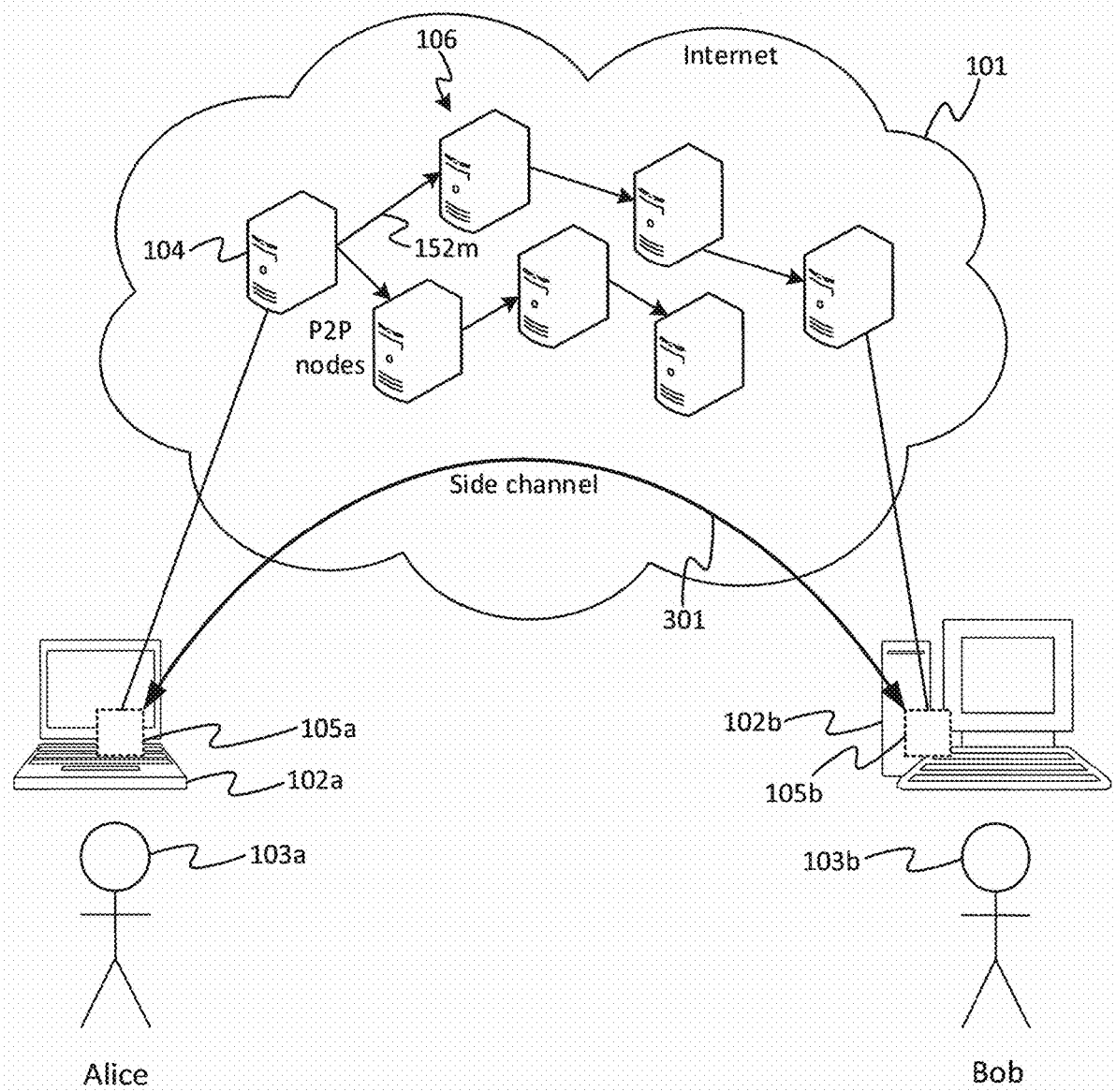
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Client Software

Figure 4:
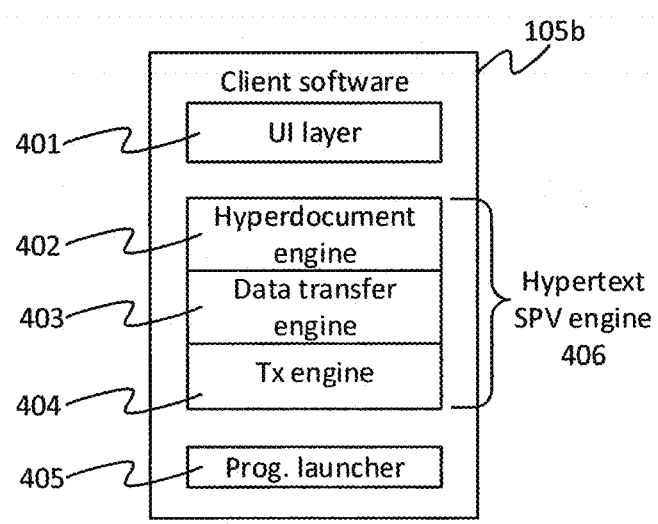
FIG. 4 is a schematic block diagram of a client application.

FIG. 4 illustrates an example implementation of the client application 105 for implementing embodiments of the presently disclosed scheme. The client application 105 comprises a transaction engine 404 and a user interface (UI) layer 401. The transaction engine 404 is configured to implement the underlying transaction-related functionality of the client 105, such as to formulate transactions 152, receive and/or send transactions and/or other data over the side channel 301, and/or send transactions to be propagated through the P2P network 106, in accordance with the schemes discussed above and as discussed in further detail shortly. Furthermore, in accordance with embodiments disclosed herein, the transaction engine 401 of at least Bob's client 105b (and potentially other clients) may further comprise any one or more of the following functional modules: a hyperdocument engine 402, a data transfer engine 403, and/or a program launcher 405. Together the hyperdocument engine 402, data transfer engine 403 and transaction engine 404 may form a hypertext SPV (simple payment verification) engine 406. The client application 105 overall may be described as an SPV wallet, or what is termed herein a hypertext SPV wallet. The functionality of these various modules will be discussed in more detail shortly.

The UI layer 401 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of any of the modules 401, 402, 403, 404, 405 may be implemented in two or more separate applications in any combination. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 5:
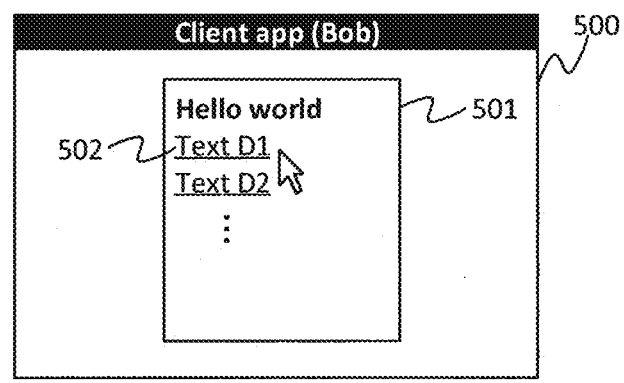
FIG. 5 is a schematic mock-up of an example user interface that may be presented by the client application of FIG. 4 in accordance with embodiments disclosed herein, FIGS. 6A-6B schematically illustrate an example set of transactions in accordance with embodiments disclosed herein.

FIG. 5 gives a mock-up of an example of the user interface (UI) 500 which may be rendered by the UI layer 401 of the client application 105b on Bob's equipment 102b, in a scenario where Bob is a consumer of data. It will be appreciated that a similar UI may be rendered by the client 105 of any other consuming party. The UI 500 may comprise one or more UI elements, e.g. 501, 502, rendered via the user output means of the consuming equipment 102.

In embodiments, the UI 500 may include a hyperdocument 501 rendered by the hypertext engine 403 through the UI layer 401. The term "hyperdocument" herein refers to any document comprising one or more hyperlinks anchored by any piece of anchor content 502 such as text or a still or moving image. In the case where at least one of the links is anchored by a piece of text, the document may be referred as a hypertext document.

Each hyperlink comprises a user-selectable UI element 502 referred to as the anchor content. The user input means is arranged to enable the user 103 (in this case Bob 103b) to select the anchor content 502, such as by clicking or touching it on-screen. When this is detected the UI layer 401 signals the selection to the hyperdocument engine 402, and in response the hyperdocument engine 402 triggers a respective link to a respective destination.

It will be appreciated that the particular means of rendering the various UI elements and selecting (actuating) the hyperlinks is not material. The functionality of these UI elements will be discussed in more detail shortly. It will also be appreciated that the UI 500 shown in FIG. 5 is only a schematized mock-up and in practice it may comprise one or more further UI elements, which for conciseness are not illustrated. The hyperdocument 501 may also take different forms and contain a different number of hyperlinks.

Transaction Hypertext

As more non-payment data is stored on the blockchain, a dedicated and secure data request and retrieval system would be desirable in order to efficiently utilise the stored data. Such a system may incorporate one or both of two functionalities: processing data requests, and linking related data. Building from existing hypertext protocols, the following discloses a blockchain-based hypertext protocol using a novel hypertext SPV wallet to retrieve data incorporated in transactions. In embodiments the wallet may also incorporate a blockchain program launcher to decode and display data incorporated in transactions. Further, embodiments may also incorporate a secure end-to-end encryption scheme into the system in order to allow for the transfer of sensitive data.

The present disclosure provides a hypertext document 500 or other such hyperdocument for use in blockchain storage functions. In embodiments this operates in an analogous manner to conventional hypertext documents. The following is described in terms of an example scenario where the second party Bob 103b is a consumer ("the consuming party") of data provided by the first party Alice 103a ("the providing party"). Note that in this scenario Bob may now be the payer and Alice may be the payee. It will be appreciated of course that the same or similar techniques could be applied mutatis mutandis with the consuming and providing roles reversed, or between other combinations of parties as the consuming and providing parties. As mentioned earlier, each party could be an individual person or an organization such as a company, academic institution, government body or charity. The providing party 103a may also be referred to herein as the "service provider", though this does not necessarily imply a company nor an organization of more than one individual person.

Various actions below may be described as being performed by the consuming party 103b and the service provider 103a. It will be appreciated that this may be used as a short-hand meaning the actions are performed via the respective software 105a, 105b run on the respective computer equipment 102a, 102b of the respective party 103a, 103b.

The consuming party 103b retrieves a hyperdocument 501 from storage and renders it through the UI layer 401 of their client software 105b, as discussed previously. In some embodiments the hyperdocument 501 may be retrieved from storage on the consuming party's own computer equipment 102b, e.g. from local storage on a user terminal of the consuming party 103b or a private storage location on a server. In the latter case this may be accessed via the same packet-switched network 101 as the blockchain network 106, e.g. the Internet, or another network such as a private local area network of the consuming party 103b. In other embodiments, the hyperdocument 501 may be retrieved from a website on the World Wide Web. In the case where the packet-switched network 101 is the Internet, the document 501 may again be accessed via the same physical network as the blockchain network 106.

As shown in FIG. 6A, in further embodiments the hyperdocument 501 may be stored in an existing transaction 152S on the blockchain 150. This may be referred to as the "source transaction" for the present purposes (note that "source" in this context means the source of the document, not necessarily the source of a payment). The hyperdocument 501 is stored in, and accessed from, a suitable payload field or fields of the source transaction 152S in which payload data (content) may be stored. For instance in an output-based model, the hyperdocument 501 may be stored in an unspendable output $203S_1$ of the source transaction 152S, e.g. an unspendable UTXO. The output in question may be made unspendable by inclusion of an opcode such as OP_RETURN which terminates execution of the script included in that output.

In such embodiments the consuming party 103b accesses the hyperdocument 501 by inspecting the relevant filed(s) of the source transaction 152S on the blockchain 150 via the blockchain network 150 (again via the packet-switched network 101 as the physical network over which the blockchain network 106 is overlaid).

As illustrated in FIG. 6A, in an output-based model the source transaction 152S comprises at least one input 202S which points back to some other, antecedent transaction (not shown). E.g. the antecedent transaction could be another transaction of the same service provider Alice, and/or a dust amount (negligible amount). Thus the service provider in effect need only pay the mining fee to place the source transaction 152S on the blockchain 150. The source transaction 152S also comprises at least one output $203S_1$, which in embodiments takes the form of an unspendable output.

E.g. using the Script language, this may be implemented by including an OP_RETURN opcode in the locking script of the output $203S_1$, which causes the script to terminate when run at a node 104 of the blockchain network 150. This enables the output instead to be used to carry any arbitrary payload data. In embodiments this is used to store the source hyperdocument 501. In most transaction protocols the transaction will also be required to have at least one spendable output $203S_0$. This could specify a payment back to the service provider, and/or a dust payment. In embodiments the outputs may be referred to as UTXOs. The source transaction 152S also comprises a header field 201S comprising the source transaction's ID, labelled here $TxID_S$. Other formats for the source transaction in other blockchains 150, transaction protocols or transaction models are not excluded. For instance it is not excluded that a different type of output-based model could be implemented that allows payload data in a spendable output $203S_0$, or that does not require all transactions to have a spendable output. Other scripting languages may have other opcodes for creating unspendable outputs. As another alternative the hyperdocument 501 could be included in the smart-contract field of a transaction in an account-based model.

The following will be exemplified in terms of the source hyperdocument 501 being stored in, and accessed from, an unspendable output $203S_1$ of a source transaction 152 in an output-based model, but it will be appreciated that this is not limiting, and more generally the same teachings regarding the content and function of the hyperdocument 501 can also apply if stored in a different type of transaction or even off-chain.

The hyperdocument 501 is a document that contains one or more hyperlinks. As shown in FIG. 6A, a hyperlink comprises at least three parts: a piece of anchor content 502 (sometimes just called the "anchor"), an identifier 601 of a destination where an item of linked data content can be found, and one or more code elements 602 which associate the identifier 601 with the respective anchor content 502 and identify the hyperlink as a link. In the case where the hyperdocument 501 is formulated in a mark-up language such as HTML, the code elements take the form of one or more tags which tag the respective anchor content 502 with the respective identifier 601 and enable it to act as the front-end of the link. The anchor content 502 is the user-viewable part of the link, which also acts as the user-control via which the user can access the link. In the case where the anchor content of at least one hyperlink comprises text, the hyperdocument 501 may be referred to as a hypertext document. However it is not excluded that the anchor content of one or more hyperlinks could alternatively or additionally comprise another form of content such as a static or video image.

The hyperdocument 501 may take any suitable form, such as an HTML page, a word processing document, a spreadsheet, a slide deck, or such like.

When the hyperdocument engine 402 renders the hyperdocument 501 via the UI 401/500 of the equipment 102b of the consuming user 103b (e.g. on-screen), it renders the anchor content 502 to the user but not the underlying identifier 601 or code elements 602. Thus the anchor content acts as the front-end of the link. Typically the hyperdocument engine 402 would render links in a distinct manner, such as by underlining them or adapting their colour, to indicate to the user that they are links and distinguish them from other, non-hyperlinked content. However this is not essential to all possible implementations (e.g. the link could be a hidden link such as an Easter egg, or the content itself may inherently explain or otherwise indicate to the user that it fronts a link).

The user interface 500 allows the user to select the anchor content 502, such as by clicking it with a point-and-click interface or touching it on a touchscreen. In response, the UI layer 401 sends a signal indicative of this to the hyperdocument engine 402. In response to this, the hyperdocument engine 402 initiates one or more actions required to access the destination content from the destination resource linked to by the respective identifier 601, such as sending one or more signals to access it via a network such as the packet-switched network 101 (e.g. Internet).

Conventionally the identifier 601 of the destination of a hyperlink would be a URL (uniform resource locator), identifying a destination in the form of a web resource. In accordance with one aspect disclosed herein however, the destination of at least one of the hyperlinks in the hyperdocument 501 is another transaction 152D on the blockchain 150, and the respective identifier is the transaction ID of the destination transaction (labelled here in the form $TxID_D$). In embodiments the language used to formulate the hyperdocument 501, or at least one or more of the transaction hyperlinks within it, may comprise a bespoke mark-up language or other such hypertext or hyperdocument language designed specifically for the application to transactions. More preferably however, the hyperdocument 501 is formulated using an existing language such as Hypertext Markup Language (HTML). In this case, only a small extension to the existing language is required, to introduce a new variant of the existing type of tag conventionally used for creating hyperlinks to URLs. Other existing types of tags can also be employed within the hyperdocument 501, such as to create bold text, set the font, play midi files, create tables, or add effects such scrolling text, etc.

HTML is the standard language for web page design, which includes instructions for content display (e.g. headings, font, images, etc.) as well as hyperlinks (links to other web pages in the form 'http://www.DOMAIN/PAGE' expected by HTTP). The blockchain hypertext document 501 disclosed herein can contain the same HTML commands for display:

Code: <b> This is bold text <\b>

Display: This is bold text

However, links are no longer necessarily to specific domains and pages, but rather can also link to transactions 152D on the blockchain 150. As such, the embedded links in the hypertext document 501 will be references to the transactions 152D where the data is stored or transactions where assembly instructions are stored if the requested data is distributed between more than one transaction. For example:

Code: <a href="TX:(txid)">Data Description> </a>

Display: Data Description

The hyperdocument engine 402 can process the commands and display the formatted page to the user 103b. Furthermore, in embodiments pages can be updated by spending the transaction 152D that contains the previous version. This linking can provide a full versioning history that can be freely recalled, and the latest version will always be contained in the UTXO set.

FIG. 6A shows an example of one destination transaction 152D1 in accordance with embodiments. In embodiments that employ an output-based model, the destination transaction 152D1 comprises at least one input 202D which points back to some other, antecedent transaction (not shown). E.g. the antecedent transaction of the destination transaction 152D1 could be another transaction of the same service provider Alice, and/or a dust amount (negligible amount). Note that the input 202D1 of the destination transaction 152D does not have to spend the output $203S_0$ of the source transaction 162S (source in the sense of a source of the hyperdocument 501). Although that is not excluded either. The destination transaction 152D1 also comprises at least one output $203D1_1$, which in embodiments takes the form of an unspendable output. E.g. using the Script language, this may again be implemented by including an OP_RETURN opcode in the locking script of the output $203S_1$. In embodiments this unspendable output $203D1_1$ is used to store destination data 603. In most transaction protocols the transaction will also be required to have at least one spendable output $203D1_0$. This could again specify a payment back to the service provider, and/or a dust payment. In embodiments the outputs may again be referred to as UTXOs. The destination transaction 152D1 also comprises a header field 201D1 comprising the destination transaction's respective ID, labelled here $TxID_{D1}$.

Other formats for the destination transaction in other blockchains 150, transaction protocols or transaction models are not excluded. For instance it is not excluded that a different type of output-based model could be implemented that allows payload data in a spendable output $203D1_0$, or that does not require all transactions to have a spendable output. Other scripting languages may have other opcodes for creating unspendable outputs. As another alternative destination data 603 could be included in the smart-contract field of a transaction in an account-based model.

The following will be exemplified in terms of destination data 603 being included in an unspendable output 203D 1 of at least one destination transaction 152D on the blockchain 150 in an output-based model, but it will be appreciated that this is not limiting, and more generally the same teachings regarding the data 603 could apply if stored in different types of transactions on other types of blockchain.

In embodiments, the source hyperdocument 501 may comprise multiple hyperlinks. One or more of them could be links to destination transactions 152D on the blockchain 150. In embodiments one or more others could be conventional links to URLs. In embodiments the source hyperdocument 501 may comprise multiple hyperlinks to different destination transactions 152D1, 152D2 on the blockchain 150. Two are shown in FIG. 6A by way of illustration, but it will be appreciated that there may be other numbers. This way the hyperdocument 501 can act as a kind of index to resources stored in a plurality of other transactions 152D1, 152D2, etc.

In embodiments each destination transaction 152D1, 152D2, etc. may have the same format as described above in relation to the first destination transaction 152D1.

Note that the service provider who provides the source hyperdocument 150 does not have to be the same service provider (providing party) who provides the destination data 603. In embodiments Alice 103a is at least the provider of the destination data 603 in at least one destination transaction 152D. The source hyperdocument may be provided by Alice or a third party provider, or may even be created by Bob himself.

The destination data 603 could be virtually any type of content, i.e. payload data or user content (as opposed to elements of the transaction 152D that relate to how it functions as a transaction on the blockchain network 106). For instance the destination data 603 may comprise text, one or more still or moving images, and/or audio content. It may take the form of another document or file. In embodiments, the destination data in at least one of the destination transactions 152D may comprise another hyperdocument, e.g. a hypertext document, comprising one or more further, onward hyperlinks to one or more further transactions 152 and/or URLs. Different data 603 may be included in different ones of the destination transactions 152D.

When the consuming user 103b selects (e.g. clicks or touches) the anchor 502 of one of the hyperlinks linking to a destination transaction 152D on the blockchain 152, the hyperdocument engine 402 triggers the data transfer engine 403 to perform a set of operations to read the destination payload data 603 from the relevant field (e.g. unspendable output $203D1_1$) of the respective destination transaction 152D (e.g. 152D1) based on the respective transaction ID 601 as read from the hyperlink. This comprises accessing the respective destination transaction 152D1 from one of the storage nodes 104S on the blockchain network 106, via the physical network 101 (e.g. the Internet) over which the blockchain network 106 is implemented.

In embodiments, in an output-based model, the hyperlink could also include an identifier of the specific output in which the data is stored. E.g. the hyperlink could specify output 1 ($203D1_1$) of transaction $TxID_{D1}$. In this case the output identifier is also read from the hyperlink and used to locate the data. However this is not essential. Alternatively the data transfer engine 403 could be configured to always read the data from the same predetermined output number of the destination transaction (e.g. it is assumed it is always stored in output #1). Or more generally in other models, the data could be stored at some predetermined location within the data structure of the destination transaction 152D. As another alternative the data transfer engine 403 could be configured to search the data structure of the destination transaction 152D for an output or for data of a predetermined form or marked in a predetermined format, e.g. by searching for any output 203 containing an OP_RETURN, or searching for some other predetermined marker.

The program launcher 405 is configured to run program code that is downloaded from the payload of a transaction 152 on the blockchain 150, e.g. from an unspendable output (such as a UTXO containing an OP_RETURN). In embodiments, the data 603 is accessed by selecting the hyperlink may comprise a program, or part thereof. In this case the hyperdocument engine 402 may be configured so as, in response to the section of the hyperlink, not only to trigger the data transfer engine 403 to access the program code 603 from the destination transaction 152D on the blockchain 150, but also to trigger the program launcher 405 to run this code 603. The code 603 as stored in the destination transaction 152D could comprise any suitable interpretable, compileable or executable code; e.g. Java script, Python, C++, or executable machine code.

Alternatively or additionally, the hyperdocument engine 402 itself, or part thereof, could take the form of a module of program code that has already been previously downloaded from another transaction 152 (not shown) on the blockchain 150 (e.g. from an unspendable output such as a UTXO containing an OP_RETURN). In this case, the code in question is accessed via some other means, other than selecting a hyperlink; and the program launcher 405 is arranged to run this portion of code in order to implement the above-described functionality of the hyperdocument engine 402.

In some embodiments, the destination data 603 may be unencrypted and freely available. In that case, the data transfer engine 403 can simply read the data 603 from the respective destination transaction 152D. The data could also be compressed, e.g. using LZM or any other known compression technique, in which case the reading of the data comprises decompressing the data. If the data 603 is of a form to be rendered to the user 103*b*, e.g. text or image date, etc., the data transfer engine 403 then causes it to be rendered through the UI layer 401 and UI 500. If the destination data 603 comprises a hyperdocument such as a hypertext document, this may comprise rendering it via the hyperdocument engine 402.

In other embodiments however, at least some of the destination data 603 may be encrypted, e.g. based on an XOR encryption or any other known encryption technique, thus requiring a decryption key to be decrypted. The decryption key may also be referred to herein as an access key. In such embodiments, then in response to the actuation of the respective hyperlink, the data transfer engine 403 uses the access key to decrypt the respective destination data 603 before decompressing it or rendering it to the consuming user 103*b*.

In some scenarios where the destination data 603 is encrypted, the consuming party 103*b* may not have the necessary access key for decrypting the data 603 at the time of actuating the respective hyperlink. In such embodiments, the data transfer engine 403 may be configured to send a request to the service provider 103*a* (providing party, i.e. provider of at least the destination data 603) in response to the actuation of the respective hyperlink. The request may be sent via a side channel 301 or via the blockchain 150 itself. Either way, in response to this, the provider 1031 returns a copy of the access key to the consuming party 103*b* subject to meeting any conditions imposed by the provider (e.g. receipt of a payment from the consuming party 103*b* and/or verification of the identity of the consuming party 103*b*).

In particular embodiments, this process may involve another transaction 152C, referred to herein as the "client transaction" since it is issued by the data transfer engine 403 of the consuming user 103*b* acting as a client of the data service provider 103*a* (providing party). An example is illustrated in FIG. 6B.

The client transaction 152C serves one or both of two functions: firstly, to pay the providing party 103*a* for the data 603; and/or secondly, to signal the request to the providing party 103*a*.

As shown in FIG. 6B, in an output-based model the client transaction 152C comprises at least one input 202C which points to an output of another, antecedent transaction of the consuming party Bob 103*b*. It may also comprise a spendable output $203C_0$ specifying a payment to the provider 103*a* of the data 603. And/or, it may comprise an unspendable output $203C_1$, e.g. made unspendable by an OP_RETURN. The unspendable output $203C_1$ comprises at least two elements: the transaction ID 604 of the destination transaction of the link that was selected (in this example $TxID_{D1}$), and a code element 605 acting as a signal that the destination data 603 is being requested from the destination transaction 152D with the specified transaction ID (in this example transaction 151D1 in FIG. 6B). The consuming party 103*b* may also sign a part of the client transaction 152C, e.g. a part comprising one or more of the outputs 203C.

When the consuming user 103*b* selects the hyperlink, then in response, the data transfer engine 403 automatically generates the corresponding client transaction 152C and sends this off to be received by the service provider 103*a*.

In embodiments this may comprise sending the client transaction 152C to the service provider 103*a* over a side channel 301. In this case, when the service provider 103*a* receives the client transaction 152C, then she reads the ID 604 and request signal 605 and in response returns the corresponding access key to the consumer 103*b*. This could be done either by sending it via the side channel 301, or by placing it in a transaction 152 on the blockchain 150 (see below). The service provider 103*a* also broadcasts the client transaction 152C to the blockchain network 106 to be recorded on the blockchain 150 in order to receive her payment. In some cases, the consuming party 103*b* may send the client transaction to the service provider 103*a* in the form of a template transaction missing one or more parts required to be recorded on the chain 150, e.g. a signature of the service provider 103*a*. In this case the service provider 103*a* takes the necessary step(s) to add the missing part(s) before broadcasting it to the network 106, for example by signing the transaction (e.g. signing a part comprising one or more of the outputs 203C). In embodiments the service provider 103*a* sends the access key to the consuming party 103*a* by malleating the client transaction to include the access key, e.g. in an unspendable output, and then broadcasting the malleated client transaction to be recorded on the blockchain 150.

In alternative embodiments, the consuming party 103*b* communicates the client transaction 152C to the service provider 103*a* by broadcasting it himself to the blockchain network 106 in order to have it recorded publicly on the blockchain 150. Optionally the consuming party 103*b* may signal to the service provider 103*a* over the side channel 301 to let her know the client transaction 152C is now on-chain. However this is not essential. As the spendable output 203C 0 of the client transaction 152C is addressed to the service provider 103*a*, this means she will be able to find it on the chain 150. Further, it can be identified as originating from the consumer Bob because the unlocking script of the transaction would contain Bob's public address and a cryptographic signature that would have required knowledge of Bob's private key.

Upon observing a satisfactory client transaction 152C on-chain, the service provider 103*a* responds with the access key. She reads the ID 604 and request signal 605 and in response returns the corresponding access key to the consumer 103*b*. Again this could be done either by sending it via the side channel 301, or by placing it in yet another transaction 152 on the blockchain 150 (see below).

As mentioned, one way for the service provider 103*a* (Alice) to provide the consumer 103*b* with the access key is to place it publicly in yet another transaction (not shown) on the blockchain 150. E.g. again this could be implemented by placing it in an unspendable output in an output based mode (e.g. a UTXO containing an OP_RETURN). The access key itself could be stored here in-the-clear. However, this would make it useable by any member of the public to access the data 603, even though only the specific consumer 103*b* (Bob) may have met the condition(s) for access (e.g. having made the payment, and/or satisfied any other verification criteria such as verification of his identity). To address this, in embodiments the access key is placed on the blockchain itself in an encrypted form, encrypted based on a shared secret that is known only to Alice and Bob, or at least to a select group including Alice and Bob.

In a variant of the above-mentioned schemes, a more complex cryptographic puzzle may be employed to ensure that only Bob obtains the access key. In this case, Alice places on the chain an encrypted piece of information that enables Bob to derive the access key. For instance, Alice may place on the blockchain 150 an encrypted password which is encrypted based on the shared secret. The destination data 603 itself may be encrypted based on an access key that is a function of the password (e.g. a function comprising one or more hashes). In this case, once Alice receives Bob's payment and/or verifies any other conditions for access, she makes the encrypted password available on the blockchain 150. Bob accesses this, decrypts it based on the shared secret, then uses the decrypted password to compute the access key, and uses the access key to decrypt the data.

Some example implementations of the above-mentioned protocols will be described in more detail shortly.

In embodiments, Alice may signal to Bob over the side channel 301 to let him know that the access key, encrypted access key or other such piece of access information is now available on the blockchain 150. Alternatively Alice does not do this, but instead an identifier of Bob in the transaction to enable him to find it for himself. For instance, Alice may address an output (e.g. UTXO) of the transaction containing the access information to Bob, preferably for a dust amount (since Bob is the one paying Alice in this scenario).

In embodiments it may be desired to update information stored in a transaction 152, either the source hyperdocument 501 in the source transaction 152S or a destination document or other such data in a destination transaction 152D. Once recorded on a blockchain an existing transaction cannot be modified. Instead therefore, in embodiments an update can be implemented by later adding a new transaction to the chain, wherein the new transaction spends a spendable output of the existing transaction which stores the data that is being updated. Thus pages the like can be updated by spending the transaction 152D that contains the previous version. This linking may even be used to provide a full versioning history that can be freely recalled, with the latest version always being contained in the UTXO set.

To implement this, the existing transaction (the one being updated) would contain at least a spendable output (and possibly an unspendable output if the data is included under an OP_RETURN or the like). Once validated, the spendable output is included in a UTXO set which is maintained at some or all of the storage and/or mining nodes 104S, 104M (e.g. typically stored by all miners and some storage nodes). To update, one would spend the spendable UTXO of the existing transaction and include the updated data in the new transaction (e.g. again in a new unspendable output of the new transaction using an OP_RETURN opcode or the like). Once validated, this new transaction is now included in the UTXO set. Therefore, the latest information will always be available in the UTXO set maintained by each storage and/or mining node 104S/M. Say for instance that one of the destination transactions 152D1 has been updated by spending that destination transaction 152D1, to create a new destination transaction 152D1' (not shown) containing the updated data. A pre-existing source document 501 will still link to the original TxID of the original destination transaction 152D1. However, when the hyperdocument engine 402 follows that link, then in embodiments it will automatically look up via the UTXO set from one of the storage or mining nodes 104S/M whether there are any subsequent transactions that spend the linked-to destination transaction 152D1. If so, it will automatically obtain the data from the later transaction instead.

Example Data Transfer Protocols

The following now describes some example implementations of the data transfer protocols that may be employed by the data transfer engine 403. In embodiments any of these may be triggered when the consuming party (Bob) 103b selects a hyperlink from the hyperdocument 501 as a means of requesting access to the data from a linked-to destination transaction 152D. Alternatively however, any of these protocols could also be used to enable a providing party (Alice) 103a to provide Bob with access to data via a transaction 152 on the blockchain 150 (e.g. from an unspendable output) regardless of whether the request for access is triggered in any way, not necessarily by selecting a hyperlink.

A first example protocol is described with reference to FIGS. 7 to 9. This may be used for instance as a peer-to-peer messaging protocol whereby one person (Alice) sends data to another person (Bob).

In order to transmit sensitive data such as personal details (name, address, banking information, medical data, etc.), additional care should preferably be taken to ensure data is securely encrypted to prevent any breach of privacy. In embodiments this may be implemented by means of a set of shared keys.

For instance, two shared secret keys $S_1, S_2$ can be securely established between two parties even over an insecure network as the two coordinates of an elliptic curve point $(x, y) = (S_1, S_2)$. Take, for example, Alice (A) with private key $V_A$ and public key, $P_A = V_A \cdot G$, and Bob (B) with private key $V_B$ and public key $P_B = V_B \cdot G$, where G is an agreed-upon elliptic curve generator point. Alice can calculate the secret using Bob's public key as:

$$(S_1, S_2) = (x, y) = V_A \cdot P_B$$

Bob can calculate the same secret using Alice's public key as:

$$P_A \cdot V_B = (V_A \cdot G) \cdot V_B = V_A \cdot V_B \cdot G = V_A \cdot (V_B \cdot G) = V_A \cdot P_B = (S_1, S_2)$$

Furthermore, using an initial establishment of a shared secret, a session key generation protocol can be used each time the user (the consuming party Bob) 103b requires access to generate a new shared key without the need for a new elliptic curve calculation. Following registering with a service provider, the user Bob will have a unique secret $S_1$ as calculated above. When Bob wishes to access the service, the service (Alice) provides a one-time use key K with a transaction, encoded with $S_1$ which Bob can retrieve. The service provider Alice can then require solution of a hash puzzle H(K) to access one or more services. This may replace conventional passwords, and in embodiments can be handled by the wallet 105b without user interaction.

An example of such a procedure is as follows, also illustrated in FIG. 7.

At step S1, Alice computes $S_1 = x_{AB}$.

At step S2, Alice computes $K \oplus S_1 = S_{K_x}$, where $\oplus$ denotes an XOR operation.

At step S3, Alice creates a transaction Tx to Bob and includes $S_{K_x}$ in the script as public text.

At step S4, Bob receives the Tx. On receipt B does not need to spend the Tx to see $S_{K_x}$.

At step S5, Bob computes $S_{AB} = x_{AB}$.

At step S6, Bob computes $K = S_{K_x} \oplus S_{AB}$.

Bob now has a session key that is private. At step S7 he can then use this for authentication and/or access to one or more services.

Note that the consumer Bob gets the key K by interacting with the blockchain 150 itself (as opposed to the service provider system). I.e. provider Alice places some encrypted information on chain that enables Bob (but not anyone else) to derive the key K based on the shared secret. However in other embodiments Alice could provide the necessary access key to Bob off-chain over a side channel 301.

Note also that the applicability of this procedure is not limited to data transfer. E.g. in other applications the key could grant Bob access to an over-the-top (OTT) video or music streaming service, or access to a rental service, etc.

Below is an example step-by-step procedure for the secure hypertext transfer for a consuming party Bob 103*b* to request data or a file from the blockchain network 106, along with a schematic diagram of the process shown in FIG. 8. In this particular example, the simplicity of the computation allows this to be achieved within a transaction script of a UTXO-based model using the OP_XOR opcode.

At step T1, Bob requests data through his UI 500 via a hyperlink. In response the UI layer 401 indicates the request to the smart SPV wallet function 406 on Bob's computer equipment 102*b* (e.g. his local computer).

At step T2, the smart SPV 406 negotiates a session key using a secure secret distribution protocol such as an XOR-based key sharing protocol and generates two private keys ($S_1$ and $S_2$). In embodiments, the consumer Bob negotiates the session key by interacting with the blockchain 150 itself (as opposed to the service provider system). For instance this can be done based on a script in a UTXO-based model based on XOR encryption. As another example it could be done in a smart contract of an account-based model. In further alternatives however, the negotiation may be performed off-chain over a side channel 301.

At step T3, the data request from Bob is encoded using $S_1$ and broadcasted to the network 106. Thus the request itself may also be broadcasted on-chain. Alternatively however, if there is an existing relationship between Alice and Bob, a side channel 301 may instead be used.

At step T4, the service provider (Alice) encodes and compresses the target data 603 (using $S_2$ derived from $S_1$) and includes this in a transaction addressed to the public address of the client (Bob's address). Thus this transaction carrying the desired data payload 603 is placed on-chain for the consumer Bob to read from the blockchain 150. As it is addressed to Bob he will be able to find it on the blockchain 150. Optionally Alice could also signal to him over a side channel 301 to alert Bob to the presence of the transaction.

Note that in order to be addressed to Bob, this Tx would include a UTXO with a payment locked to the address of consumer Bob. This can be a dust (negligible) amount, but by locking an output to Bob's address, he is notified of the transaction where he then knows the TxID he needs. Otherwise, Alice and Bob would need a side channel 301 to communicate the TxID.

At step T5, the SPV 406 of Bob's smart wallet 105*b* receives the transaction, decrypts it using the shared secret $S_2$, and then decodes the data.

At step T6, the decoded data is displayed to Bob through the UI 500. In embodiments this may be done using the blockchain program launcher 405.

Embodiments may employ a specially designed SPV wallet 105*b* as an intermediary between the client and the blockchain network. Use of an SPV wallet will allow for secure use across devices without the need for large data storage. In some implementations, by performing a Merkle proof, the data received may be verified locally using only the block headers, allowing smart phones and other mobile devices to connect to the service. This is the primary feature of operating the smart wallet on an SPV node.

In embodiments the SPV wallet 105*b* may have any or all of the following three distinct functions. The first is key management and monitoring the blockchain network for relevant transactions, e.g. using bloom filters. This may include establishing a shared private session key with the sender 103*a*. The second function is turning hyperlink clicks into transaction requests via transactions to propagate through the blockchain network 106. The third is to decrypt and inflate data in transactions.

The first point is standard in a conventional SPV wallet and, as such, not discussed further here. However, the second point, converting hyperlink clicks into transactions, is not standard. As discussed above, a hyperlink contains the transaction identification and an actionable link. Upon clicking the link, the SPV will be triggered to create a transaction 152C sufficient to pay the transaction fees and any service fees for the data request service. This transaction can also redeem tokens in exchange for the requested data. Using OP_PUSHDATA or OP_RETURN a 'request' signal along with the desired transaction ID can be included in the signed transaction. Using the protocol explained above, the data can be encoded using OP_XOR and the mutual shared key. Similarly, the XOR operation can be used to decrypt the data and the data can be inflated using the LZM dictionary and passed to the blockchain program launcher 405.

FIG. 9 shows an example structure of the request and response transactions to establish connection between, Bob who is requesting information from a particular transaction, and Alice who is agreeing to provide the encrypted data. Following payment, Alice can use a session key to send the data encrypted to Bob.

Figure 11:
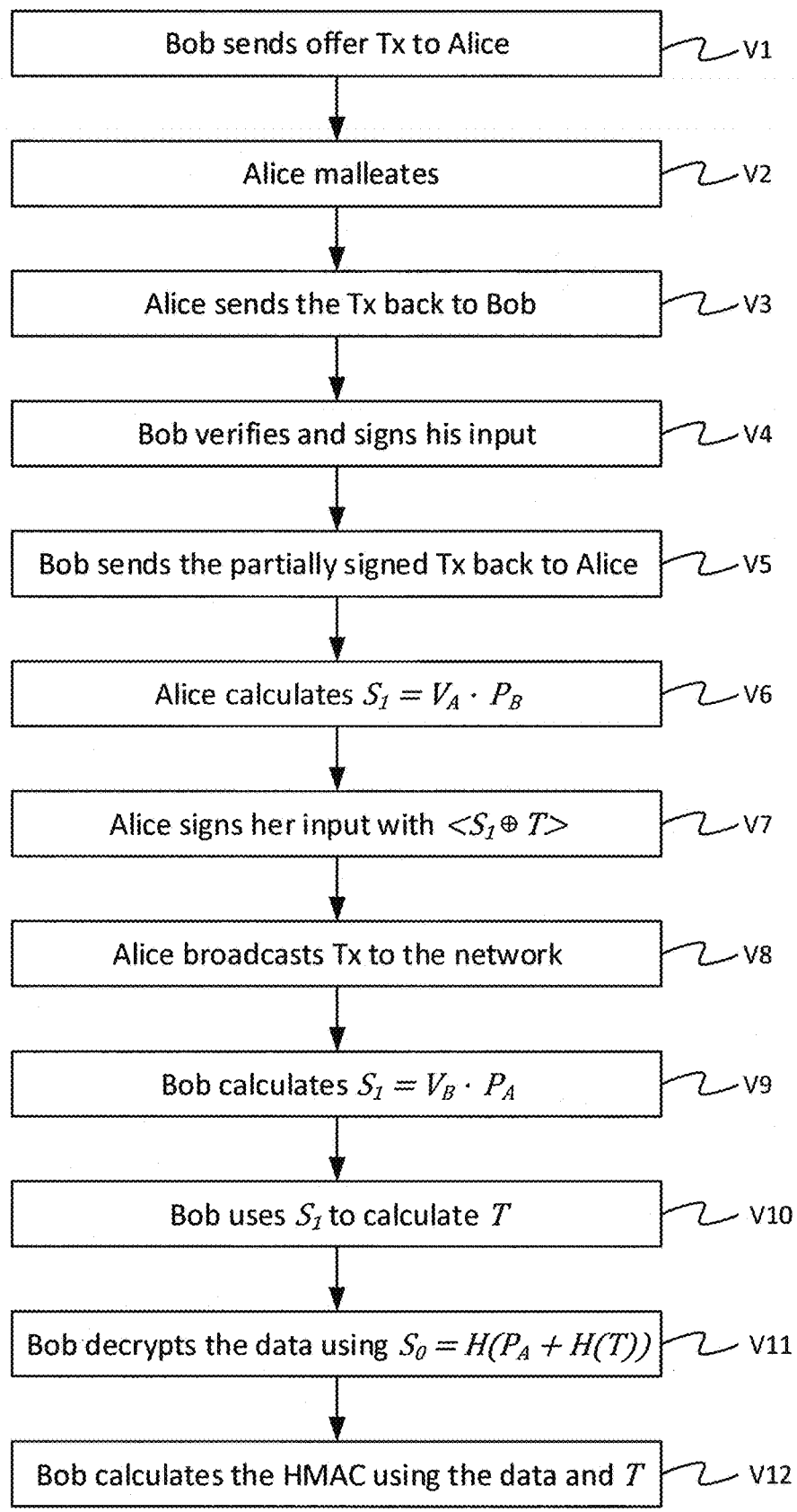
FIG. 11 is a flow chart illustrating an example of data exchange procedure in accordance with embodiments disclosed herein.

A second example protocol is now described with reference to FIGS. 10 and 11. This may be used for example as a hypertext request and response system whereby someone (Alice) can post data once and sell access to one or more other people (including Bob).

With a user's data request broadcasted to the blockchain network 106, there will need to be a system in place to process the request, retrieve the data, and then preferably compress the data in a transaction addressed to the client. The following discloses both centralized and decentralized solutions to data distribution. Through decentralisation of these processes, such a system would no longer rely on a single entity (such as an individual or corporation) to provide data to the network as any peer can fulfil the request. This would eliminate denial-of-service (DoS) attacks or downtime due to system updates or technical issues. Furthermore, through incentivizing the response through the user including some fee, this system can improve the response time. This cost decreases the potential for a DoS attack as an attacker would have to provide a fee for each request.

As a data provider 103*a*, the first stage involves storing encrypted data on the blockchain, which proceeds as follows in terms of a data provider Alice (A). See also FIG. 10.

At step U1, Alice selects a random string T, used as a password to access to the data.

At step U2, Alice calculates $S_0=H(P_A+H(T))$.

At step U3, Alice encrypts the data 603 using $S_0$ or some set of derived keys, e.g. as discussed above.

At step U4, Alice constructs a transaction to herself with the following stored as an OP_RETURN output: the encrypted data 603, a description of the data, an asking price of the data, and a hash-based message authentication code (HMAC) calculated in terms of the hash of the encrypted data and the password T. HMACs in themselves are known in the art. This transaction is the data storage transaction (the destination transaction 152D in the above examples where a hyperlink is used, though this protocol is not limited to use with a hyperlink as the means to access the destination transaction).

This transaction, once included in the blockchain, can serve many functions simultaneously. First, it is a permanent immutable record of the encrypted data that can be accessed by the data owner at any point in the future by recording the transaction identification (TXID). Second, this can act as an advertisement for the data that can be searched by interested buyers. Finally, the inclusion of the HMAC can be used by the buyer to verify Alice's honesty and assist in dispute resolution, described in more detail below.

An example of the data exchange procedure between a data provider, Alice, and data buyer, Bob, is as follows. See also FIG. 11.

At step V1, Bob sends an offer transaction to Alice in the form of a template transaction over a side channel 301, with Alice's public address or prefix (as listed in data storage transaction) along with price in the OP_RETURN.

At step V2, Alice maleates the received template transaction in order to construct a transaction with two inputs: the UTXO sent by Bob, and a UTXO of her own. Although Bob is the one paying in this scenario, the input pointing to a UTXO of Alice will alert her of the transaction: her wallet will detect the transaction if addressed to her. Therefore no side channel is needed for this stage. The pointed-to UTXO of Alice could be for a dust amount.

At step V3, Alice sends the malleated transaction back to Bob over the side channel 301.

At step V4, Bob verifies the transaction was constructed properly and signs his input if he is satisfied.

At step V5, Bob then sends the partially signed transaction back to Alice over the side channel 301.

At step V6, Alice calculates $S_1 = V_A \cdot P_B$, where $V_A$ is Alice's private key and $P_B$ is Bob's public key.

At step V7, Alice signs her input with $(S_1 \oplus T)$ as part of the input script, which is publicly exposed. This transaction does not itself contain the data. So this transaction is 152C in the example of FIG. 6, and the data will be included in another transaction 152D.

At step V8 Alice broadcasts the now fully-signed transaction to the blockchain network 106 to be recorded on the blockchain 150.

At step V9, Bob calculates $S_1 = V_B \cdot P_A$, where $V_B$ is Bob's private key and $P_A$ is Alice's public key.

At step V10, Bob uses $S_1$ to calculate T ($S_1 \oplus T \oplus S_1 = T$).

At step V11, Bob then decrypts the data using $S_0 = H(P_A + H(T))$.

At step V12, Bob calculates HMAC using the data and T. Bob checks that the HMAC matches the HMAC in the data storage transaction 152D.

The above-described method advantageously integrates payment and data transfer, and allows the sending of data over a blockchain 150 in a manner that ensures that Alice gets paid and Bob receives the data.

If Alice is honest, the HMAC will match that in the data storage transaction and the data will be as described in the description part of the data storage transaction. If Alice sends the incorrect key, Bob can prove this using the key he sent and the hash of the encrypted data in the data storage transaction. If Alice sends the incorrect data, Bob can detect this by using the key to encrypt the data and compare it to that in the data storage transaction. Additionally, a trusted third-party organization such as a government or company can keep record of the data and the encrypted data and be used to verify the encrypted data matches with the description provided.

The above method may be summarised more generally as follows. The data is encrypted with key $S_0$ (which in this example is not part of the shared secret). Alice does not include an encrypted version of the key $S_0$ in the transaction, but rather an encrypted version of the password T (encrypted based on the shared secret $S_1$). The key $S_0$ needed to decrypt the data is a predetermined function of the password (in this case a hash-based function, which is also a function of Alice's public key $P_A$). Bob decrypts the password, then uses the known function to compute S0, and uses this to decrypt the data. The HMAC is included in the data-storing transaction and is a function of the data and the password. Now that Bob has the purported T and data from Alice, he can compute the HMAC and compare with the version in the data storing transaction.

An advantage sending Bob the encrypted password and making $S_0$ a function of the password (as opposed to just sending him an encrypted version of the key directly as in the previous method of FIGS. 7-9), is to prevent $S_0$ from ever being transmitted. $S_0$ if the transmission is ever compromised, it doesn't directly compromise the data. The attacker would also have to know how to calculate the S0, which Alice and Bob could share over a secure side channel for example. The function does not necessarily also need to be a function of Alice's public key, but just some deterministic piece of information that both parties know. That information could comprise an extra parameter such as Alice's public key, or just the form of the transformation (i.e. the function) itself.

In variants of the above methods, the data could be stored off-chain and then placed on-chain as-and-when requested by Bob. I.e. Alice performs the method of FIG. 10 in response to a request from Bob for the data, rather than in advance.

A further case to consider is a centralised data repository service similar to a contemporary cloud-based system. In this case, a single organization is responsible for storing, recording and retrieving data stored on the blockchain, or possibly even external private servers. A client who wishes to store their data on the blockchain would pay a registration or a per-use fee to the provider who can encrypt and distribute their data and keep record of retrieval. This eliminates the need for individual users to keep record of their encryption or private keys. Similarly, for services with large amounts of data that can be shared, such as a music or video streaming service, registration or per-use fees could be charge for access to the data.

For each case, the client initiates a request via a publicly-available address provided by the service with the details of their request included within the transaction. The identity of the client is verified, any conditions such as usage fees are validated and then a session key may be generated using the protocol disclosed earlier. Upon receiving the request, the service provider encodes the requested data using a standardised compression algorithm such as a Lempel-Ziv Markov chain (LZM) algorithm and includes this within a transaction addressed to the client. The data is decrypted and decoded by the client's SPV wallet and then displayed to the user.

In the context of the peer-to-peer protocol above, the repository service can act as a trusted third party to facilitate the exchange of data between the data provider and data buyer. The repository service can keep descriptions of the data to allow data buyers to make requests for particular data or buy batches of related data. The services can also construct the transactions, eliminating the need for the users to verify or create transactions or transaction conditions. If the repository services is trusted, it also eliminated the need of the HMAC as the data repository would be liable to check the validity of the data providing.

Conclusion

The ability to efficiently request and retrieve data stored on the blockchain will become increasingly important as more and larger data is included within transaction. The protocols disclosed herein provide a method of request-response of the blockchain network much like hypertext transfer protocol (HTTP) did for the internet. Preferably the method would be standardized. Using standardised hypertext formatting, data within the blockchain can be linked and requested using a click in an enabled browser with help from an SPV wallet or the like. Both centralised and decentralised data storage can be accommodated and monetized to compensate the service providers and data owners. Using previously developed encryption techniques, it is possible to make the request and data transfer steps secure over public networks.

It will be appreciated that the above embodiments have been described by way of example only.

More generally, according to one aspect disclosed herein there is provided method comprising, by computer equipment of a consuming party: accessing at least a first document comprising one or more hyperlinks, each hyperlink comprising a respective piece of anchor content and a respective identifier of a respective destination associated with the respective anchor content; rendering content of at least part of the first document through a user output device of the computer equipment of the consuming party, including rendering the respective anchor content of one or more of the hyperlinks; through a user input device of the computer equipment of the consuming party, receiving a user input selecting one of the hyperlinks by selecting the respective anchor content from among the rendered content; and in response to said user input, automatically accessing data from the associated destination based on the respective identifier included in the first document; wherein the respective destination of at least the selected hyperlink comprises a destination transaction of a blockchain maintained across at least some nodes of a blockchain network, and the accessing of the data comprises inspecting the destination transaction in the blockchain via the blockchain network.

In embodiments the first document may comprise a hypertext document.

In embodiments, each piece of anchor content may comprise text or an image.

The output device may for example comprise an array of pixels of a display screen or touchscreen for displaying text and/or images, and/or a speaker for outputting audible content. In the case of an image the image may comprise a still image and/or video image. The input device may comprise for example the sensor matrix of the touchscreen; or a mouse, trackpad or trackball; or a keyboard, etc.

In embodiments, the first document may be formulated (written) in a mark-up language.

In embodiments, the first document may be an HTML document in which HTML language is augmented with an additional type of tag for creating hyperlinks to blockchain transactions.

In embodiments, the first document may be accessed via the blockchain network from another, source transaction on the blockchain.

In embodiments, the first document may be stored in an unspendable output of the source transaction.

In embodiments the blockchain may use an output-based (e.g. UTXO-based) transaction model in which each transaction comprises one or more outputs (e.g. UTXOs), each comprising a locking script, and the first document may be stored in an unspendable one of these outputs of the source transaction. In embodiments, the unspendable output of the source transaction may be made unspendable by a command such as OP_RETURN, included in the locking script, which terminates the locking script when run by a node of the blockchain network.

In alternative implementations the techniques disclosed herein could be implemented through an account-based mode. For example the data could be stored in, and accessed from, a smart-contract of the destination transaction.

In embodiments, the first document may be accessed from a website or from local storage of the computer equipment of the consuming party.

In embodiments, the first document may comprise a plurality of said hyperlinks, wherein the respective destinations of at least some of these may be different respective transactions on the blockchain.

And/or, the respective destinations of the plurality of hyperlinks may comprise a combination of one or more destination transactions on the blockchain and one or more web resources.

In embodiments, the rendering of the anchor content may comprise rendering it in a format indicative that it is operable as a hyperlink. E.g. this could comprise underlining it or rendering in a specific colour.

In embodiments, the accessed data may comprise a second document comprising content in the form of text and/or one or more images, and the accessing of the second document may comprise rendering at least part of the second document on the computer equipment of the consuming user.

In embodiments the second document may itself comprise one or more further hyperlinks.

In embodiments, said one or more further hyperlinks comprise at least one hyperlink to yet another destination transaction on the blockchain.

In embodiments, the second document comprises a hypertext document. The second document may be formulated in a mark-up language. The second document may be a HTML document augmented with at least one additional type of tag for creating links to transactions on the blockchain.

In embodiments, said data may be stored in an unspendable output of the respective destination transaction.

In embodiments the blockchain may use an output-based (e.g. UTXO-based) transaction model in which each transaction comprises one or more outputs (e.g. UTXOs), each comprising a locking script, and the first document may be stored in an unspendable one of these outputs of the destination transaction. In embodiments, the unspendable output of the destination transaction may be made unspendable by a command such as OP_RETURN, included in the locking script, which terminates the locking script when run by a node of the blockchain network.

In embodiments each hyperlink may further comprise an output identifier of the respective individual output in which the data is stored in the respective associated destination transaction, and said accessing of the data may comprise accessing it from the respective output based on the respective transaction identifier and output identifier. Alternatively the data could be stored in a predetermined output number of the destination transaction or more generally a predetermined location, in which case the accessing of the data simply comprises accessing it from the predetermined output or location. As another possibility, the accessing of the data could simple comprise searching the respective destination transaction for data or an output of a predetermined expected type or format.

In embodiments, said data may comprise encrypted data.

In embodiments, the method may further comprise, from the computer equipment of the consuming party, sending a client transaction in order to: request a providing party to provide access to the encrypted data, and/or pay the providing party for access to the encrypted data. The client transaction may either be sent to be recorded on the blockchain network or sent to the providing party over a side channel.

In embodiments the same client transaction may implement both functions.

The payment may be included in a spendable output of the client transaction, the spendable output being addressed to the providing party. The blockchain may use an output-based (e.g. UTXO-based) transaction model in which each transaction comprises one or more outputs (e.g. UTXOs), and the spendable output may be one of these outputs of the client transaction.

The sending could comprise the consuming party broadcasting the client transaction directly to the network him/herself. Alternatively the consuming party could send the client transaction to the providing party or a third party over a side channel, for the providing party or third party to broadcast to forward onwards to the network.

As another alternative the consuming party may send the client transaction to the providing party via a side channel. The client transaction may be sent in template form, e.g. requiring the providing party to sign it or add an input before it can be recorded in the blockchain.

In embodiments, the client transaction may include a request message comprising the identifier of the destination transaction and a signal requesting access to the encrypted data.

In embodiments, the request message may be included in an unspendable output of the client transaction.

In embodiments the blockchain may use an output-based (e.g. UTXO-based) transaction model in which each transaction comprises one or more outputs (e.g. UTXOs), each comprising a locking script, and said request message may be stored in an unspendable one of these outputs of the client transaction. In embodiments, the unspendable output of the client transaction may be made unspendable by a command such as OP_RETURN, included in the locking script, which terminates the locking script when run by a node of the blockchain network.

In embodiments, said sending of the client transaction may be triggered by said user input.

In embodiments the consuming party may send the client transaction to the providing party over a side channel, then the providing party reads it and broadcasts to the blockchain network. Alternatively the consuming party could broadcast the client transaction to the blockchain network and separately signal to the providing party over the side channel that the client transaction has been broadcast to the blockchain network. Alternatively the consuming party could simply broadcast the payment to the blockchain network without separately signalling to the providing party over the side channel at all, and simply allow the providing party to observe the client transaction on the blockchain. As the client transaction contains a payment addressed to the providing party, then he/she/they will be able to find it on the chain.

In embodiments, in response to the client transaction, the providing party may provide access information enabling the consuming party to determine an access key for decrypting the encrypted data and thereby access the encrypted data. In this case the method may comprise, by the computer equipment of the consuming party: receiving said access information, determining the access key therefrom, and using the determined access key to decrypt and thus access the encrypted data.

In some such embodiments, the access key may be a one-time or temporary key.

In embodiments, the providing party may provide the access information to the consuming user by including said information in a transaction on the blockchain.

Alice (the providing party) could broadcast this transaction to the blockchain network and separately signal to Bob (the consuming party) over the side channel that it has now been broadcast. Alternatively the providing party could simply broadcast it to the network without separately signalling to the consuming party over the side channel at all, and allow the consuming party to observe this transaction on the chain. The transaction in question may comprise an output addressed to the consuming party. This way the transaction is addressed to the consuming party and so he/she/they can find it on chain this way. This output may comprise a dust payment to the consuming party.

In embodiments the consuming party may send the client transaction to the providing party in template form over a side channel. In some such embodiments, the providing party provides the access information by malleating the template to include the access information and broadcasting the malleated client transaction to the network to be recorded on the blockchain. Alternatively the access information could be included in a separate transaction than the client transaction.

In another alternative, the providing party could simply send the required information to the consuming party over a side channel without including it in a transaction or putting it on the blockchain.

The access information could comprise the access key itself in-the-clear. However, in the case where it is communicated on-chain, this would then make the access key available to any other member of the public. Even if sent of the side channel, it could be vulnerable to interception or being leaked by the intended consumer for example.

Therefore in embodiments, the access information does not comprise the access key in-the-clear, but rather information enabling the consuming party to derive the access key therefrom based on a shared secret shared between the providing and consuming parties.

In such embodiments, said access information may comprise an encrypted version of the access key encrypted based on a shared secret shared between the providing party and the consuming party. In this case the method may further comprise, by the computer equipment of the consuming party, decrypting the access key based on the shared secret, and using the decrypted access key to access the encrypted data.

In an alternative variant of this, said access information may comprise an encrypted password encrypted based on a shared secret shared between the providing party and the consuming party, and the access key is a first predetermined function of the password. In this case the method may further comprise, by the computer equipment of the consuming party: decrypting the password based on the shared secret, determining the access key by applying the first predetermined function to the decrypted password, and using determined the access key to access the encrypted data. In some such embodiments, said function may also a function of a public key of the providing party. E.g. in embodiments the first function may comprise $H(P_A+H(T))$ where T is the password and $P_A$ is the public key, and each H is a hash function.

In embodiments, the data may be included in the destination transaction along with a message authentication code which is a second predetermined function of the password, the second predetermined function also being a function of the data. In this case the method may comprise, by the computer equipment of the consuming party: computing the message authentication code by applying the second predetermined function to the decrypted password and the data, and comparing the computed message authentication code with the message authentication code included in the destination transaction in order to determine the authenticity of the data.

E.g. in embodiments the authentication code may be a hash-based message authentication code, the second predetermined function being a hash-based function of the data and the password. The hash-based function comprises at least one hash.

In embodiments, the accessed data may comprise a program, and the method further comprises running the program on the computer equipment of the consuming party. Alternatively or additionally, the method may comprise, by the computer equipment of the consuming party, an initial step of reading a program from yet another transaction on the blockchain and running the program, wherein the program performs said steps of rendering the content, receiving the user input and accessing the data from the destination.

The program may be included in an unspendable output, e.g. UTXO, of the program-storing transaction. This output may be made unspendable by an opcode such as OP_RETURN included in its locking script which terminates the locking script.

In embodiments, the method may comprise updating the first and/or second document by means of a spending transaction spending the source and/or destination transaction respectively.

In embodiments the method may comprise, in response to said user input, automatically querying a transaction set of the blockchain to check for any update transactions spending the destination transaction. In this case said accessing of the data from the destination transaction may be performed on condition that said check is negative, the method being performed by a function configured so as otherwise to access the data from the update transaction.

According to another aspect there is provided a set of transactions for recordal in a blockchain, the set comprising, embodied on a computer-readable data medium or media: a first transaction storing a first document comprising one or more hyperlinks, each hyperlink comprising a respective piece of anchor content and a respective identifier linking to a destination associated with the respective anchor content; and one or more second transactions each storing data content, wherein the destination linked to by at least one of the hyperlinks in the first transaction comprises one of the second transactions.

The data content in each of the second transactions may comprise text and/or image data. The data linked to by the at least one hyperlink may comprise a second document stored in said one of the second transactions. In some such embodiments, the second document may itself comprise one or more hyperlinks to one or more further destinations, e.g. comprising one or more further transactions on the blockchain.

According to another aspect disclosed herein, there is provided a method of a consuming party accessing data from a providing party wherein the data is stored in a first transaction on a blockchain in encrypted form requiring an access key to decrypt. The method comprises, by computer equipment of the consuming party: communicating to the providing party a second transaction for recordal on the blockchain, the second transaction specifying a payment for the data and further including an identifier of the first transaction and a signal indicating a request for the data therefrom, wherein in response the second party broadcasts a third transaction including an encrypted password to be recorded on the blockchain. The method further comprises: inspecting the blockchain to read the encrypted password from the third transaction, wherein the password is encrypted based on a shared secret between the consuming party and the providing party, and the access key is a first predetermined function of the password; and decrypting the received password based on the shared secret, determining the access key by applying the predetermined function to the decrypted password, and decrypting the data based on the determined access key. The data is included in the first transaction along with a message authentication code being a second predetermined function of the password, the second predetermined function also being a function of the data. The method further comprises computing the message authentication code based on the decrypted data and the determined password, and comparing the computed message authentication code with the message authentication code as included in the first transaction in order to authenticate the data.

In embodiments, said communicating of the second transaction may comprise communicating the second transaction to the second party over a side channel.

In embodiments, said communicating of the second transaction may comprise communicating it in template form, for the providing party to complete and broadcast to be recorded on the blockchain.

In embodiments, the completed version of the second transaction may be the third transaction, said completion comprising adding the encrypted password.

In embodiments, the first predetermined function may also be a function of a public key of the providing party. E.g. the first predetermined function may comprise $H(P_A+H(T))$ where T is the password and $P_A$ is the public key, and each H is a hash function.

In embodiments, the message authentication code may be a hash-based message authentication code, the second predetermined function being a hash based function. The hash-based function may comprise one or more hashes.

According to another aspect disclosed herein, there is provided a set of transactions for recordal in a blockchain, the set comprising, embodied on a computer-readable data medium or media: a data-storage transaction comprising data in encrypted form requiring an access key to decrypt, wherein the data-storage transaction further comprises a message authentication code being a predetermined function of a password and of the data; and one or more further transactions, at least one of which specifies a payment for the data and includes an identifier of the first transaction and a signal indicating a request for the data therefrom; wherein at least one of the one or more further transactions comprises the password encrypted based on a shared secret shared between a consuming party and a providing party, the access key being a predetermined function of the password.

In embodiments the set of transactions may be further configured in accordance with any of the above-described embodiments.

According to another aspect disclosed herein, there is provided a computer program embodied on computer-readable storage and configured so as when run on the computer equipment of the consuming party to perform a method according to any embodiment disclosed herein.

According to another aspect there is provided the equipment of the consuming party, comprising: memory comprising one or more memory units, and processing apparatus comprising one or more processing units; wherein the memory stores code arranged to run on the processing apparatus, the code being configured so as when run to perform a method according to any embodiment disclosed herein.

According to another aspect disclosed herein, there may be provided a method comprising the actions of the consuming party, providing party, any third party that may be involved, and/or the network of nodes.

According to another aspect disclosed herein, there may be provided a system comprising the computer equipment of the consuming party, the computer equipment of the providing party, the computer equipment of any third party, and/or the network of nodes.

Other variants or use cases of the disclosed techniques may become apparent to the person skilled in the art once given the disclosure herein. The scope of the disclosure is not limited by the described embodiments but only by the accompanying claims.

The invention claimed is:

1. A method of a consuming party accessing data from a providing party wherein the data is stored in a first transaction on a blockchain in encrypted form requiring an access key to decrypt; the method comprising, by computer equipment of the consuming party:
communicating to the providing party a second transaction for recordal on the blockchain, the second transaction specifying a payment for the data and further including an identifier of the first transaction and a signal indicating a request for the data therefrom, wherein in response the second party broadcasts a third transaction including an encrypted password to be recorded on the blockchain;
inspecting the blockchain to read the encrypted password from the third transaction, wherein the password is encrypted based on a shared secret between the consuming party and the providing party, and the access key is a first predetermined function of the password; and
decrypting the received password based on the shared secret, determining the access key by applying the predetermined function to the decrypted password, and decrypting the data based on the determined access key;
wherein the data is included in the first transaction along with a message authentication code being a second predetermined function of the password, the second predetermined function also being a function of the data; and
the method further comprises computing the message authentication code based on the decrypted data and the determined password, and comparing the computed message authentication code with the message authentication code as included in the first transaction in order to authenticate the data.

2. The method of claim 1, wherein said communicating of the second transaction comprises communicating the second transaction to the second party over a side channel.

3. The method of claim 2, wherein said communicating of the second transaction comprises communicating it in template form, for the providing party to complete and broadcast to be recorded on the blockchain.

4. The method of claim 3, wherein the completed version of the second transaction is the third transaction, said completion comprising adding the encrypted password.

5. The method of claim 1, wherein the first predetermined function is also a function of a public key of the providing party.

6. The method of claim 1, wherein the message authentication code is a hash-based message authentication code, the second predetermined function being a hash based function.

7. A computer program enabling a consuming party to access data from a providing party wherein the data is stored in a first transaction on a blockchain in encrypted form requiring an access key to decrypt; the computer program being embodied on non-transitory computer-readable storage and configured so as when run on computer equipment of the consuming party to perform operations of:
communicating to the providing party a second transaction for recordal on the blockchain, the second transaction specifying a payment for the data and further including an identifier of the first transaction and a signal indicating a request for the data therefrom, wherein in response the second party broadcasts a third transaction including an encrypted password to be recorded on the blockchain;
inspecting the blockchain to read the encrypted password from the third transaction, wherein the password is encrypted based on a shared secret between the consuming party and the providing party, and the access key is a first predetermined function of the password; and
decrypting the received password based on the shared secret, determining the access key by applying the predetermined function to the decrypted password, and decrypting the data based on the determined access key;
wherein the data is included in the first transaction along with a message authentication code being a second predetermined function of the password, the second predetermined function also being a function of the data; and
the method further comprises computing the message authentication code based on the decrypted data and the determined password, and comparing the computed message authentication code with the message authentication code as included in the first transaction in order to authenticate the data.

8. The computer program of claim 7, wherein said communicating of the second transaction comprises communicating the second transaction to the second party over a side channel.

9. The computer program of claim 8, wherein said communicating of the second transaction comprises communicating it in template form, for the providing party to complete and broadcast to be recorded on the blockchain.

10. The computer program of claim 9, wherein the completed version of the second transaction is the third transaction, said completion comprising adding the encrypted password.

11. The computer program of claim 7, wherein the first predetermined function is also a function of a public key of the providing party.

12. The computer program of claim 7, wherein the message authentication code is a hash-based message authentication code, the second predetermined function being a hash based function.

13. Computing equipment of a consuming party, comprising:
  memory comprising one or more memory units, and
  processing apparatus comprising one or more processing units;
  wherein the memory stores code arranged to run on the processing apparatus, the code being configured so as when run to perform a method of the consuming party accessing data from a providing party wherein the data is stored in a first transaction on a blockchain in encrypted form requiring an access key to decrypt; the method comprising:
  communicating to the providing party a second transaction for recordal on the blockchain, the second transaction specifying a payment for the data and further including an identifier of the first transaction and a signal indicating a request for the data therefrom, wherein in response the second party broadcasts a third transaction including an encrypted password to be recorded on the blockchain;
  inspecting the blockchain to read the encrypted password from the third transaction, wherein the password is encrypted based on a shared secret between the consuming party and the providing party, and the access key is a first predetermined function of the password; and
  decrypting the received password based on the shared secret, determining the access key by applying the predetermined function to the decrypted password, and decrypting the data based on the determined access key;
  wherein the data is included in the first transaction along with a message authentication code being a second predetermined function of the password, the second predetermined function also being a function of the data; and
  the method further comprises computing the message authentication code based on the decrypted data and the determined password, and comparing the computed message authentication code with the message authentication code as included in the first transaction in order to authenticate the data.

14. The computing equipment of claim 13, wherein said communicating of the second transaction comprises communicating the second transaction to the second party over a side channel.

15. The computing equipment of claim 14, wherein said communicating of the second transaction comprises communicating it in template form, for the providing party to complete and broadcast to be recorded on the blockchain.

16. The computing equipment of claim 15, wherein the completed version of the second transaction is the third transaction, said completion comprising adding the encrypted password.

17. The computing equipment of claim 13, wherein the first predetermined function is also a function of a public key of the providing party.

18. The computing equipment of claim 13, wherein the message authentication code is a hash-based message authentication code, the second predetermined function being a hash based function.

* * * * *